(12) United States Patent
Rosenberg et al.

(10) Patent No.: US 12,321,529 B2
(45) Date of Patent: *Jun. 3, 2025

(54) HAPTIC ACTUATOR SYSTEM INCLUDING A MULTI-LAYER INDUCTOR AND A MAGNETIC ELEMENT

(71) Applicant: Sensel, Inc., Sunnyvale, CA (US)

(72) Inventors: Ilya Daniel Rosenberg, Sunnyvale, CA (US); Ninad Sathe, Sunnyvale, CA (US); Harsha Rao, Sunnyvale, CA (US); Darren Lochun, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/128,923

(22) Filed: Mar. 30, 2023

(65) Prior Publication Data

US 2023/0305637 A1    Sep. 28, 2023

Related U.S. Application Data

(63) Continuation-in-part of application No. 17/946,931, filed on Sep. 16, 2022, now Pat. No. 12,093,458,
(Continued)

(51) Int. Cl.
*G06F 3/01* (2006.01)
*G06F 3/02* (2006.01)
(Continued)

(52) U.S. Cl.
CPC ............ *G06F 3/0202* (2013.01); *G06F 3/016* (2013.01); *H01H 13/85* (2013.01);
(Continued)

(58) Field of Classification Search
CPC ...... G06F 3/0202; G06F 3/016; G06F 1/1684; G06F 1/169; G06F 3/03547;
(Continued)

(56) References Cited

U.S. PATENT DOCUMENTS

| 7,663,607 B2 | 2/2010 | Hotelling et al. |
| 8,981,242 B2 | 3/2015 | Bayramoglu |
| | (Continued) | |

FOREIGN PATENT DOCUMENTS

| CN | 102007465 A | 4/2011 |
| CN | 102341768 A | 2/2012 |
| | (Continued) | |

OTHER PUBLICATIONS

Notice of Allowance received in U.S. Appl. No. 17/367,572 dated Feb. 3, 2022.
(Continued)

*Primary Examiner* — Rodney Amadiz
(74) *Attorney, Agent, or Firm* — Run8 Patent Group, LLC; Peter Miller; Alexander Rodriguez

(57) ABSTRACT

One variation of a system for a haptic actuator includes: a substrate; a baseplate; a magnetic element; and a set of spacer elements. The substrate includes: a first layer including a first spiral trace coiled in a first direction; and a second layer. The second layer is arranged below the first layer and includes a second spiral trace: coiled in a second direction opposite the first direction; and coupled to the first spiral trace to form an inductor. The substrate further includes terminals arranged about a periphery of the substrate and coupled to the inductor. The baseplate is arranged opposite the substrate. The magnetic element is: arranged on the baseplate; and defines a first polarity facing the inductor. The first set of spacer elements are: interposed between the baseplate and the substrate; arranged proximal edges of the baseplate; and defines a nominal gap between the magnetic element and the inductor.

20 Claims, 15 Drawing Sheets

Related U.S. Application Data which is a continuation of application No. 17/626,669, filed as application No. PCT/US2021/053660 on Oct. 5, 2021, now Pat. No. 11,880,506, application No. 18/128,923 is a continuation-in-part of application No. 17/855,747, filed on Jun. 30, 2022, now Pat. No. 11,703,950, which is a continuation of application No. 17/367,572, filed on Jul. 5, 2021, now Pat. No. 11,422,631, which is a continuation-in-part of application No. 17/092,002, filed on Nov. 6, 2020, now Pat. No. 11,360,563, which is a continuation of application No. 16/297,426, filed on Mar. 8, 2019, now Pat. No. 10,866,642, which is a continuation-in-part of application No. 15/845,751, filed on Dec. 18, 2017, now Pat. No. 10,564,839, which is a continuation-in-part of application No. 15/476,732, filed on Mar. 31, 2017, now Pat. No. 10,331,265.

(60) Provisional application No. 63/404,768, filed on Sep. 8, 2022, provisional application No. 63/325,387, filed on Mar. 30, 2022, provisional application No. 63/088,359, filed on Oct. 6, 2020, provisional application No. 63/048,071, filed on Jul. 3, 2020, provisional application No. 62/640,138, filed on Mar. 8, 2018, provisional application No. 62/316,417, filed on Mar. 31, 2016, provisional application No. 62/343,453, filed on May 31, 2016.

(51) Int. Cl.
  H01H 13/85 (2006.01)
  *H01H 3/00* (2006.01)
  *H01H 13/785* (2006.01)

(52) U.S. Cl.
  CPC ..... *H01H 2003/008* (2013.01); *H01H 13/785* (2013.01); *H01H 2201/036* (2013.01); *H01H 2215/05* (2013.01)

(58) Field of Classification Search
  CPC ............ G06F 2203/04103; G06F 2203/04105; G06F 3/04144; G06F 3/04886; H01H 13/85; H01H 13/785; H01H 2003/008; H01H 2201/036; H01H 2215/05
  See application file for complete search history.

(56) References Cited

U.S. PATENT DOCUMENTS

| | | | |
|---|---|---|---|
| 9,019,207 | B1 | 4/2015 | Hamburgen et al. |
| 9,058,377 | B2 | 6/2015 | Deshwal et al. |
| 9,158,377 | B2 | 10/2015 | Shinozaki |
| 9,229,592 | B2 | 1/2016 | Bulea et al. |
| 9,454,268 | B2 | 9/2016 | Badaye et al. |
| 9,459,736 | B2 | 10/2016 | Badaye et al. |
| 9,829,981 | B1 | 11/2017 | Ji |
| 9,983,757 | B2 | 5/2018 | Porter et al. |
| 10,101,859 | B2 | 10/2018 | Jin |
| 10,209,846 | B2 | 2/2019 | Wang et al. |
| 10,459,542 | B1 | 10/2019 | Costante et al. |
| 10,495,486 | B2 | 12/2019 | Liu |
| 10,564,839 | B2 | 2/2020 | Rosenberg et al. |
| 10,585,481 | B2 | 3/2020 | Czelnik et al. |
| 10,635,248 | B2 | 4/2020 | Hinson et al. |
| 11,360,563 | B2 | 6/2022 | Rosenberg et al. |
| 11,422,631 | B2 | 8/2022 | Junus et al. |
| 2002/0149561 | A1 | 10/2002 | Fukumoto et al. |
| 2003/0095095 | A1 | 5/2003 | Pihlaja |
| 2005/0038944 | A1 | 2/2005 | Harada et al. |
| 2005/0180082 | A1 | 8/2005 | Nakamura et al. |
| 2007/0015966 | A1 | 1/2007 | Niwa et al. |
| 2008/0202251 | A1 | 8/2008 | Serban et al. |
| 2009/0256817 | A1 | 10/2009 | Perlin et al. |
| 2010/0141606 | A1 | 6/2010 | Bae et al. |
| 2010/0231530 | A1 | 9/2010 | Lin et al. |
| 2010/0253633 | A1 | 10/2010 | Nakayama et al. |
| 2011/0025631 | A1 | 2/2011 | Han |
| 2011/0025648 | A1 | 2/2011 | Laurent et al. |
| 2011/0090151 | A1 | 4/2011 | Huang et al. |
| 2011/0134061 | A1 | 6/2011 | Lim |
| 2011/0248957 | A1 | 10/2011 | Park |
| 2012/0050207 | A1 | 3/2012 | Westhues et al. |
| 2012/0068938 | A1 | 3/2012 | Kontio |
| 2012/0068971 | A1 | 3/2012 | Pemberton-Pigott |
| 2012/0154316 | A1 | 6/2012 | Kono |
| 2012/0188194 | A1 | 7/2012 | Sulem et al. |
| 2012/0235942 | A1 | 9/2012 | Shahoian et al. |
| 2013/0106718 | A1 | 5/2013 | Sundara-Rajan |
| 2013/0187742 | A1 | 7/2013 | Porter et al. |
| 2014/0002113 | A1 | 1/2014 | Schediwy et al. |
| 2014/0008203 | A1 | 1/2014 | Nathan et al. |
| 2014/0055407 | A1 | 2/2014 | Lee et al. |
| 2014/0347311 | A1 | 11/2014 | Joharapurkar et al. |
| 2015/0002416 | A1 | 1/2015 | Koike et al. |
| 2015/0054768 | A1 | 2/2015 | Grant et al. |
| 2015/0091858 | A1 | 4/2015 | Rosenberg et al. |
| 2015/0185842 | A1 | 7/2015 | Picciotto et al. |
| 2015/0185848 | A1 | 7/2015 | Levesque et al. |
| 2016/0062574 | A1 | 3/2016 | Anzures et al. |
| 2016/0165931 | A1 | 6/2016 | Lengerich et al. |
| 2016/0195931 | A1 | 7/2016 | Czelnik et al. |
| 2016/0209441 | A1 | 7/2016 | Mazzeo et al. |
| 2016/0259411 | A1 | 9/2016 | Yoneoka et al. |
| 2016/0370899 | A1 | 12/2016 | Chang et al. |
| 2017/0076885 | A1 | 3/2017 | Stryker |
| 2017/0285848 | A1 | 10/2017 | Rosenberg et al. |
| 2017/0336891 | A1 | 11/2017 | Rosenberg et al. |
| 2017/0336904 | A1 | 11/2017 | Hsieh et al. |
| 2017/0344115 | A1 | 11/2017 | Ji |
| 2018/0059791 | A1 | 3/2018 | Hajati |
| 2019/0196646 | A1 | 6/2019 | Rosenberg et al. |
| 2019/0212842 | A1 | 7/2019 | Hinson et al. |
| 2019/0212874 | A1 | 7/2019 | Nathan et al. |
| 2019/0265834 | A1 | 8/2019 | Rosenberg et al. |
| 2019/0339776 | A1 | 11/2019 | Rosenberg et al. |
| 2021/0333880 | A1 | 10/2021 | Junus et al. |

FOREIGN PATENT DOCUMENTS

| | | |
|---|---|---|
| CN | 101828161 B | 4/2013 |
| CN | 104199563 B | 3/2017 |
| EP | 0469255 A1 | 2/1992 |
| EP | 0469255 B1 | 6/1995 |
| EP | 2375308 A1 | 10/2011 |
| EP | 3043240 A1 | 7/2016 |
| JP | H1185380 A | 3/1999 |
| JP | H11212725 A | 8/1999 |
| JP | 2002149312 A | 5/2002 |
| JP | 2004310518 A | 11/2004 |
| JP | 2007026344 A | 2/2007 |
| JP | 2008192092 A | 8/2008 |
| JP | 2011048409 A | 3/2011 |
| JP | 2011048665 A | 3/2011 |
| JP | 2011209785 A | 10/2011 |
| JP | 2012027875 A | 2/2012 |
| JP | 2012048407 A | 3/2012 |
| JP | 2012181833 A | 9/2012 |
| JP | 2012522317 A | 9/2012 |
| JP | 2015002853 A | 1/2015 |
| JP | 2015125666 A | 7/2015 |
| WO | 2010104953 A1 | 9/2010 |
| WO | 2011111906 A1 | 9/2011 |
| WO | 2012081182 A1 | 6/2012 |
| WO | 2013001779 A1 | 1/2013 |
| WO | 2013104919 A1 | 7/2013 |
| WO | 2013186844 A1 | 12/2013 |
| WO | 2016035628 A1 | 3/2016 |
| WO | 2018112466 A1 | 6/2018 |

(56) References Cited

FOREIGN PATENT DOCUMENTS

WO          2019021466 A1     1/2019
WO          2019156672 A1     8/2019

OTHER PUBLICATIONS

Office Action received in CN 202180032862.0 dated Mar. 29, 2023.
Office Action received in U.S. Appl. No. 17/626,669 dated Jun. 23, 2023.
Extended EP Search Report received in App. No. 19764714.5 dated Nov. 15, 2021.
International Search Report and Written Opinion for International Patent Application No. PCT/US21/053660, mailed on Dec. 30, 2021, 12 pages.
International Search Report received in PCT/US19/21466 dated Jun. 21, 2019.
International Search Report received in PCT/US21/0753 dated Jul. 27, 2021.
ISR received in PCT/US2021/040404 dated Oct. 20, 2021.
Japanese Patent Application No. 2020546911 dated Nov. 8, 2021.
Non-Final Office Action for U.S. Appl. No. 17/557,024 dated Aug. 9, 2022.
Notice of Allowance and Fees Due for U.S. Appl. No. 17/586,524 dated Feb. 6, 2023.
Notice of Allowance received in U.S. Appl. No. 17/092,002 dated Sep. 20, 2021.
Notice of Allowance received in U.S. Appl. No. 17/191,636 dated Oct. 1, 2021.
Notice of Allowance received in U.S. Appl. No. 17/191,631 dated Oct. 27, 2021.
Office Action received in U.S. Appl. No. 16/297,426 dated Apr. 22, 2020.
Office Action received in U.S. Appl. No. 17/154,944 dated Jul. 29, 2021.
Office Action received in U.S. Appl. No. 17/367,576 dated Mar. 9, 2022.

*FIGURE 10B*  *FIGURE 10C*

HAPTIC ACTUATOR SYSTEM INCLUDING A MULTI-LAYER INDUCTOR AND A MAGNETIC ELEMENT

CROSS-REFERENCE TO RELATED APPLICATIONS

This application claims the benefit of U.S. Provisional Application No. 63/404,768, filed on 8 Sep. 2022, and 63/325,387, filed on 30 Mar. 2022, each of which is incorporated in its entirety by this reference.

This application is a continuation-in-part application of U.S. patent application Ser. No. 17/946,931, filed on 16 Sep. 2022, which is a continuation of U.S. patent application Ser. No. 17/626,669, filed on 12 Jan. 2022, which claims the benefit under 35 U.S.C. 371 to International Application No. PCT/US21/53660, filed on 5 Oct. 2021, which claims priority to U.S. Provisional Patent Application 63/088,359, filed on 6 Oct. 2020, each of which is incorporated in its entirety by this reference.

This application is also a continuation-in-part application of U.S. patent application Ser. No. 17/855,747, filed on 30 Jun. 2022, which is a continuation of U.S. patent application Ser. No. 17/367,572, filed on 5 Jul. 2021, which claims priority to U.S. Provisional Application No. 63/048,071, filed on 3 Jul. 2020, which is incorporated in its entirety by this reference.

U.S. patent application Ser. No. 17/367,572 is also a continuation-in-part application of U.S. patent application Ser. No. 17/092,002, filed on 6 Nov. 2020, which is a continuation application of U.S. patent application Ser. No. 16/297,426, filed on 8 Mar. 2019, which claims the benefit of U.S. Provisional Application No. 62/640,138, filed on 8 Mar. 2018, each of which is incorporated in its entirety by this reference.

U.S. patent application Ser. No. 16/297,426 is also a continuation-in-part application of U.S. patent application Ser. No. 15/845,751, filed on 18 Dec. 2017, which is a continuation-in-part application of U.S. patent application Ser. No. 15/476,732, filed on 31 Mar. 2017, which claims the benefit of U.S. Provisional Application No. 62/316,417, filed on 31 Mar. 2016, and U.S. Provisional Application No. 62/343,453, filed on 31 May 2016, each of which is incorporated in its entirety by this reference.

This application is related to U.S. patent application Ser. No. 17/191,631, filed on 3 Mar. 2021, which is incorporated in its entirety by this reference.

TECHNICAL FIELD

This invention relates generally to the field of haptic actuators and more specifically to a new and useful slim haptic actuator system in the field of haptic actuators.

BRIEF DESCRIPTION OF THE FIGURES

FIGS. 10A, 10B, 10C, and 10D are a schematic representation of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
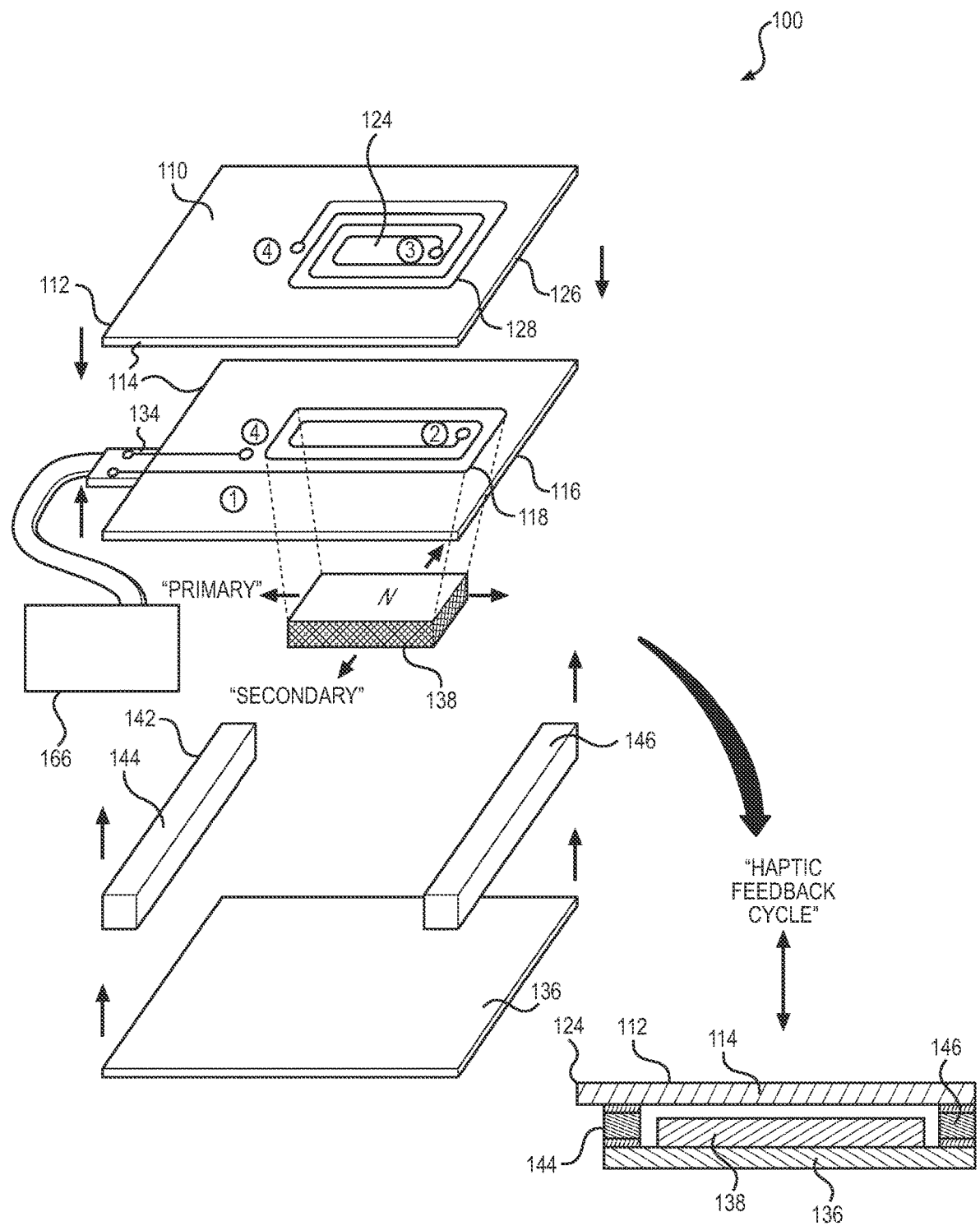
FIG. 1 is a schematic representation of the system.

As shown in FIG. 1, a system 100 for delivering haptic feedback includes: a first haptic actuator 110, a cover layer 162, and a controller 166.

The first haptic actuator 110 includes: a substrate 112, a baseplate 136, a first magnetic element 138; and a first set of spacer elements 142. The substrate 112 includes: a set of inductor layers 114 defining a first multi-layer inductor 124; and a first set of terminals 134 arranged about a periphery of the substrate 112 and coupled to the first multi-layer inductor 124. The baseplate 136 is arranged opposite the substrate 112. The first magnetic element 138: is arranged on the baseplate 136; and defines a first polarity facing the first multi-layer inductor 124. The first set of spacer elements 142: are interposed between the baseplate 136 and the substrate 112; are arranged proximal perimeter edges of the baseplate 136; and defines a nominal gap between the first magnetic element 138 and the first multi-layer inductor 124.

The cover layer 162 is arranged over the first haptic actuator 110 and defines a touch sensor surface.

The controller 166 is coupled to the first set of terminals 134 and is configured to, in response to detecting a first input on the touch sensor surface, drive an oscillating voltage across the first multi-layer inductor 124 to: induce alternating magnetic coupling between the first multi-layer inductor 124 and the first magnetic element 138; and oscillate the substrate 112 and the cover layer 162 relative to the first magnetic element 138.

Figure 2:
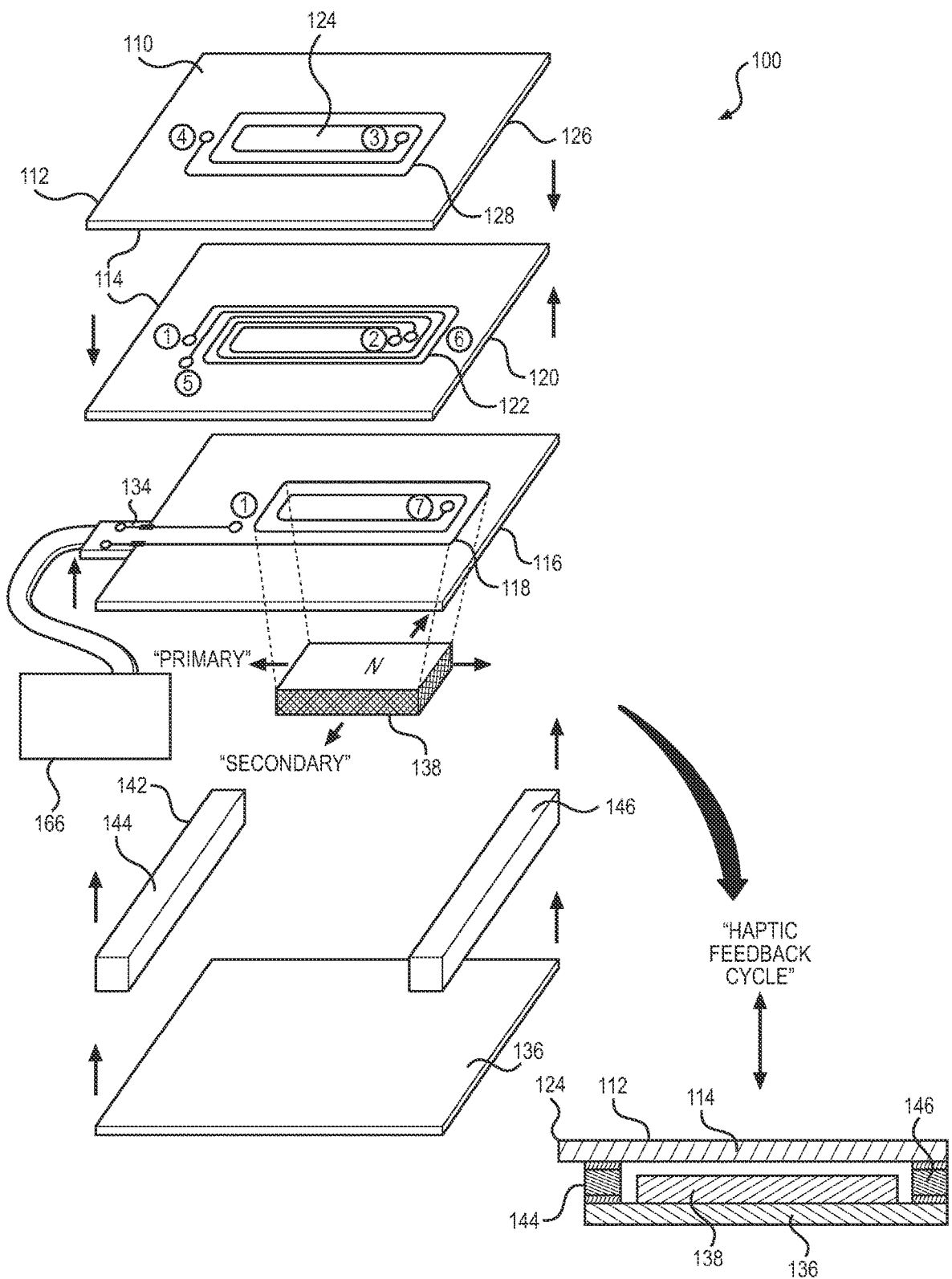
FIG. 2 is a schematic representation of a system.
Figure 4:
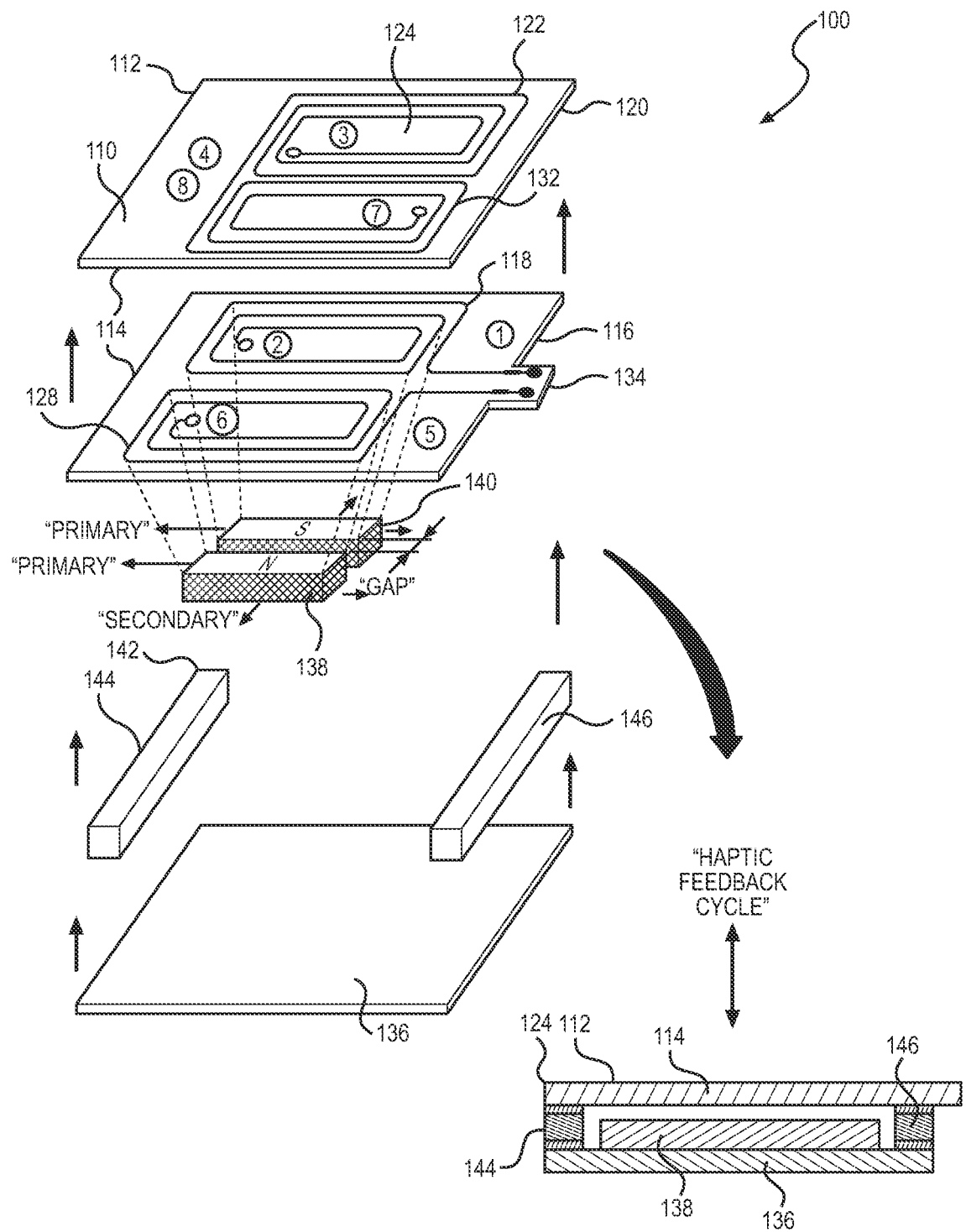
FIG. 4 is a schematic representation of the system.
Figure 5A:
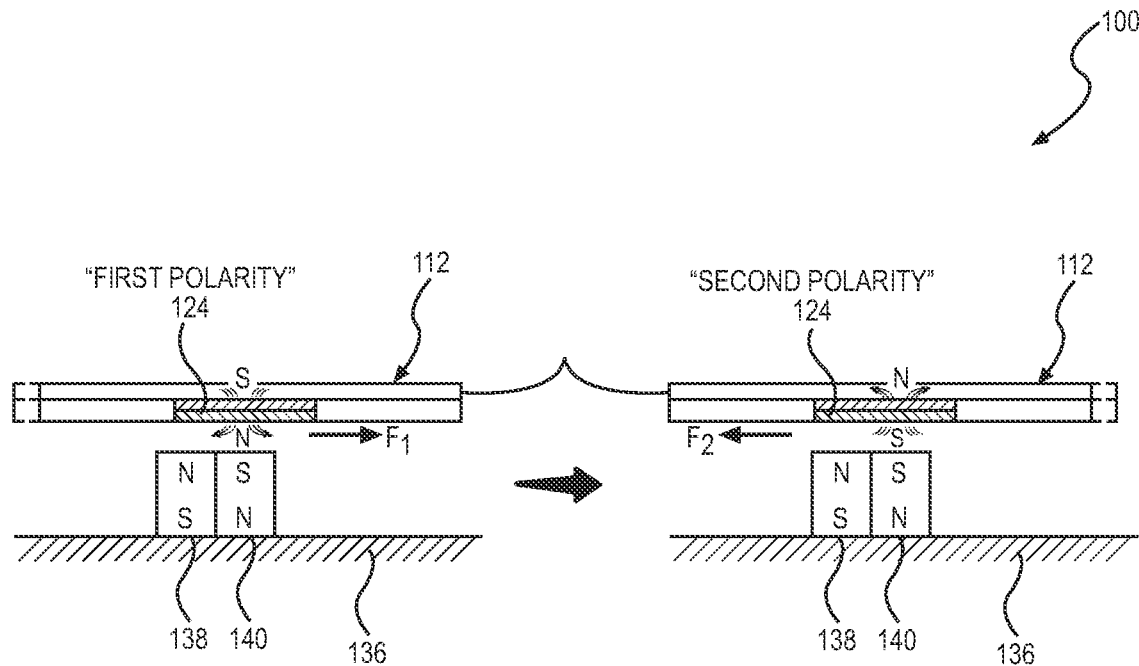
FIGS. 5A and 5B are a schematic representation of the system.
Figure 5B:
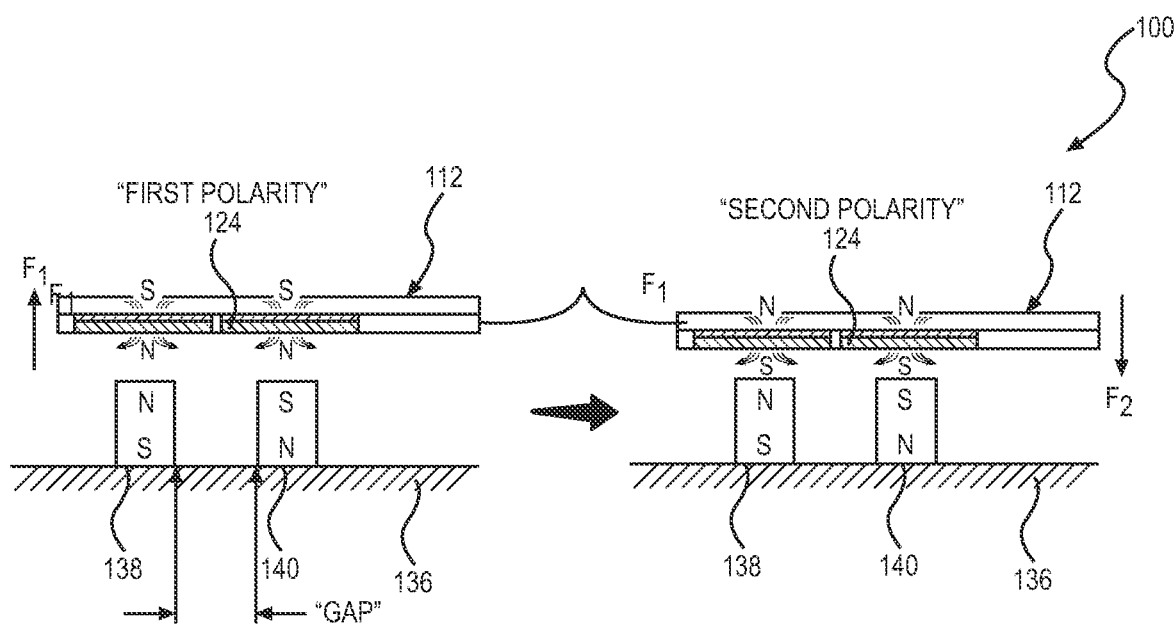
Figure 6A:
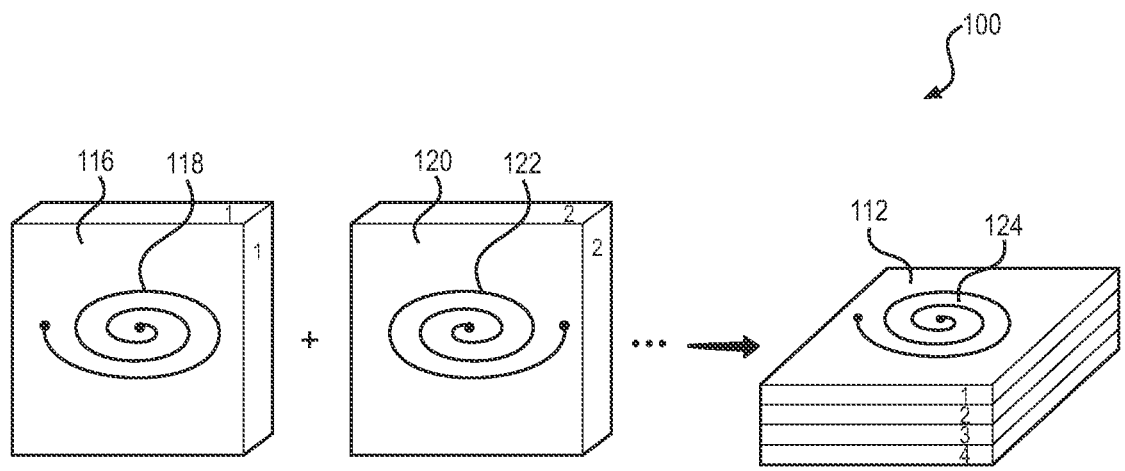
FIGS. 6A and 6B are a schematic representation of the system.
Figure 6B:
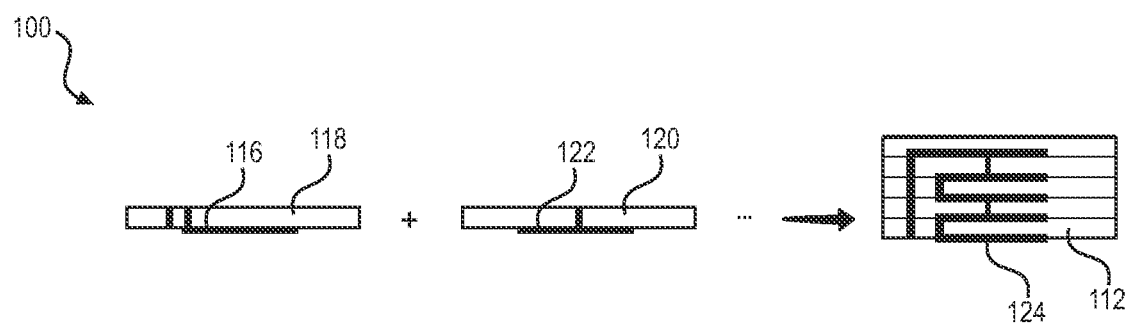
Figure 7:
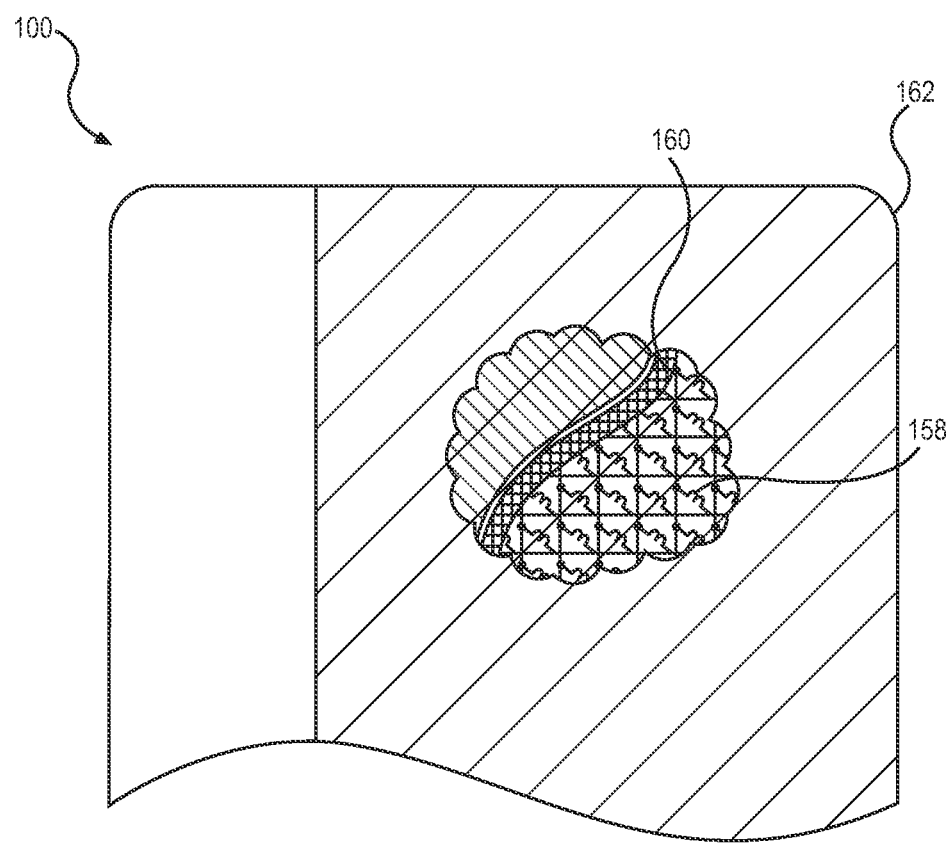
FIG. 7 is a schematic representation of the system.
Figure 8:
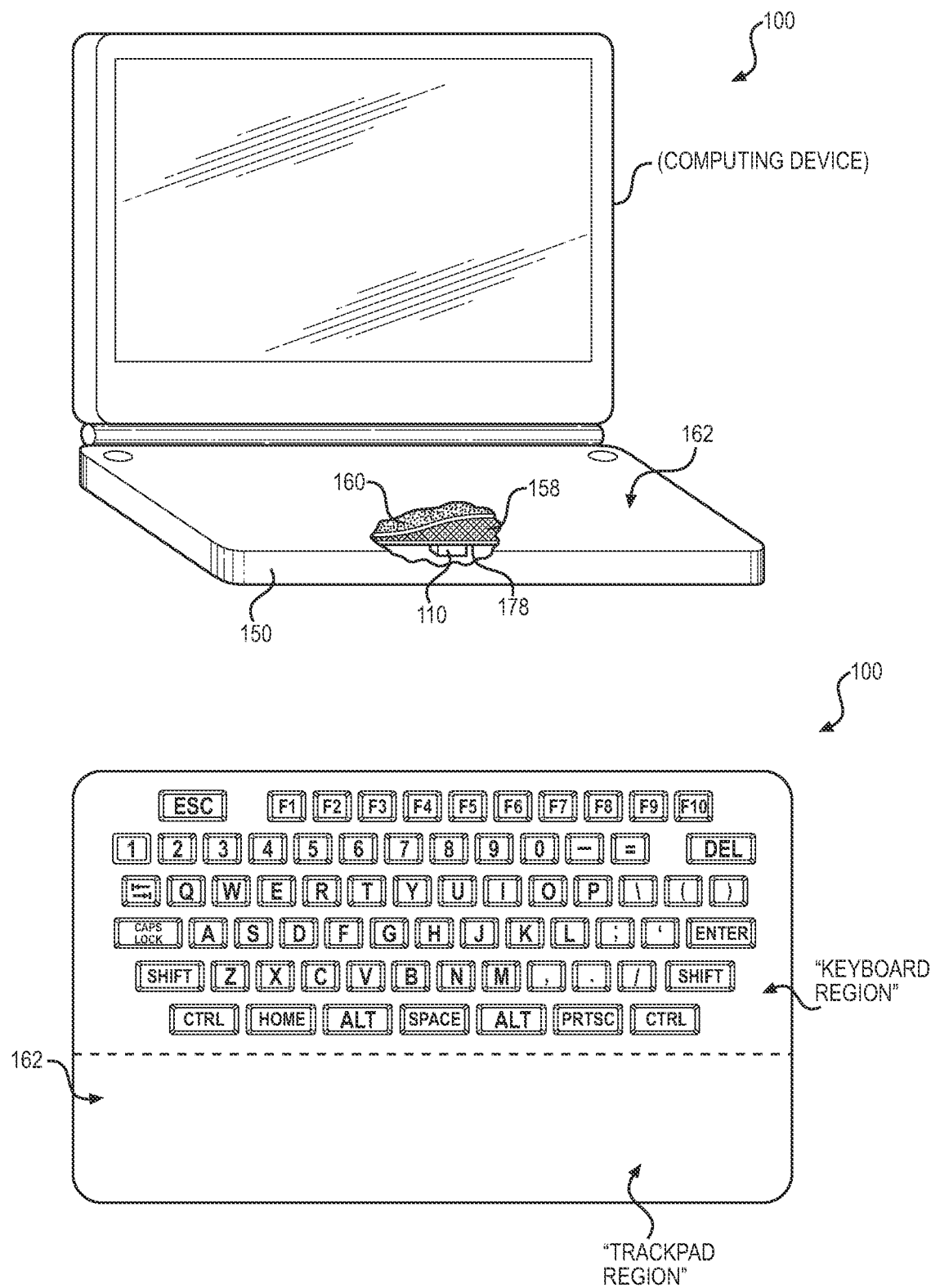
FIG. 8 is a schematic representation of the system.
Figure 9A:
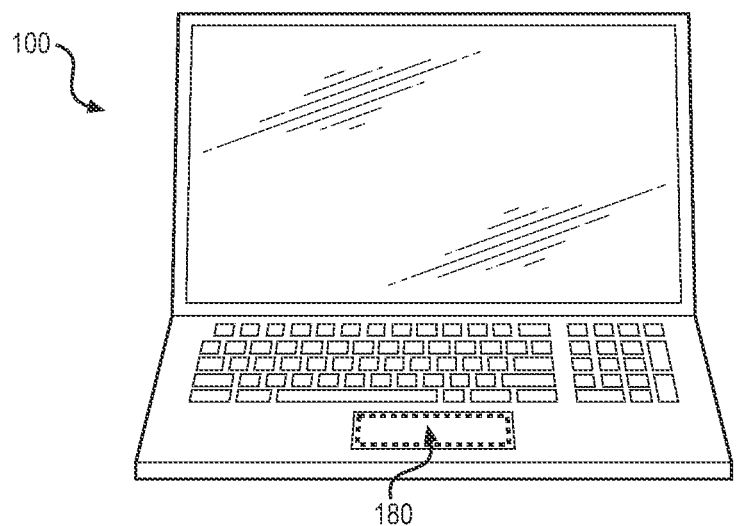
FIGS. 9A, 9B, and 9C are a schematic representation of the system.
Figure 9B:
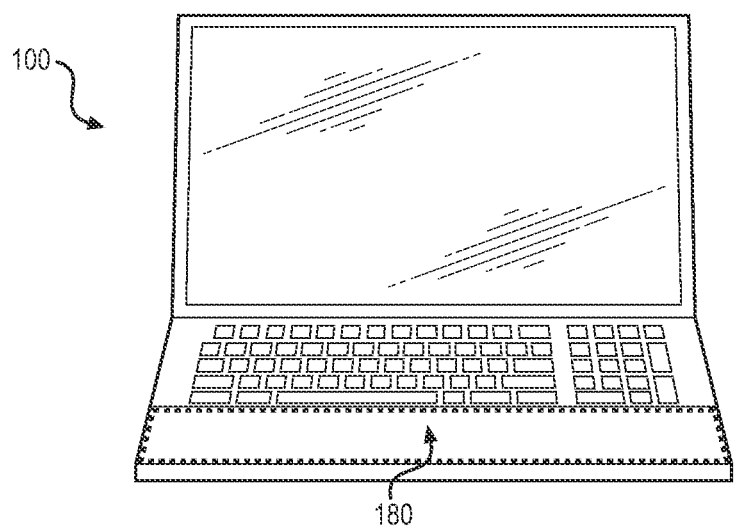
Figure 9C:
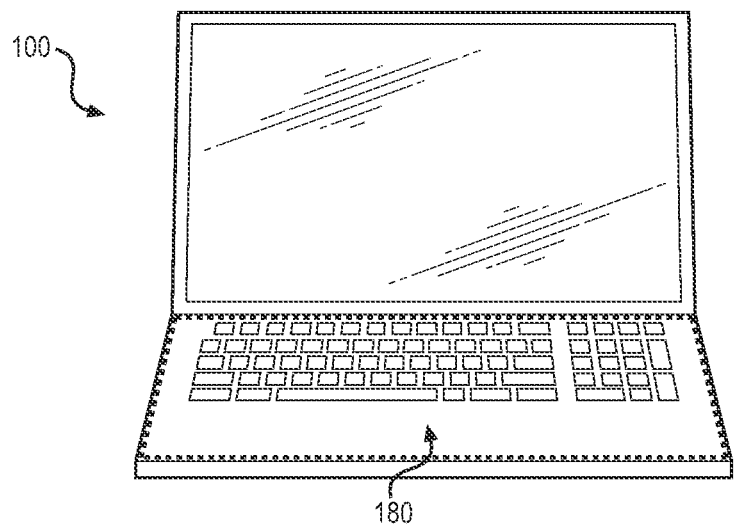
Figure 10A:
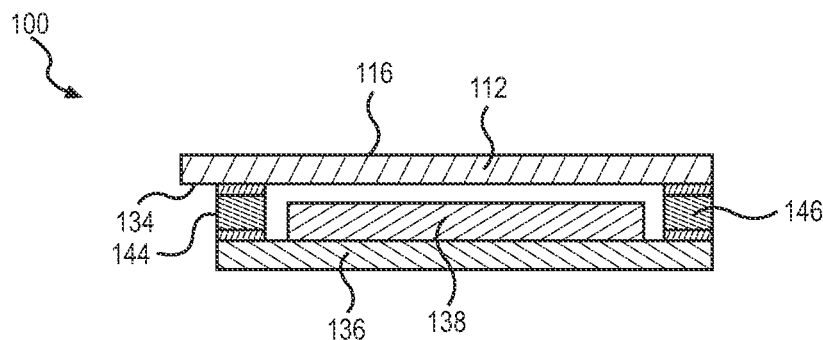
Figure 10D:
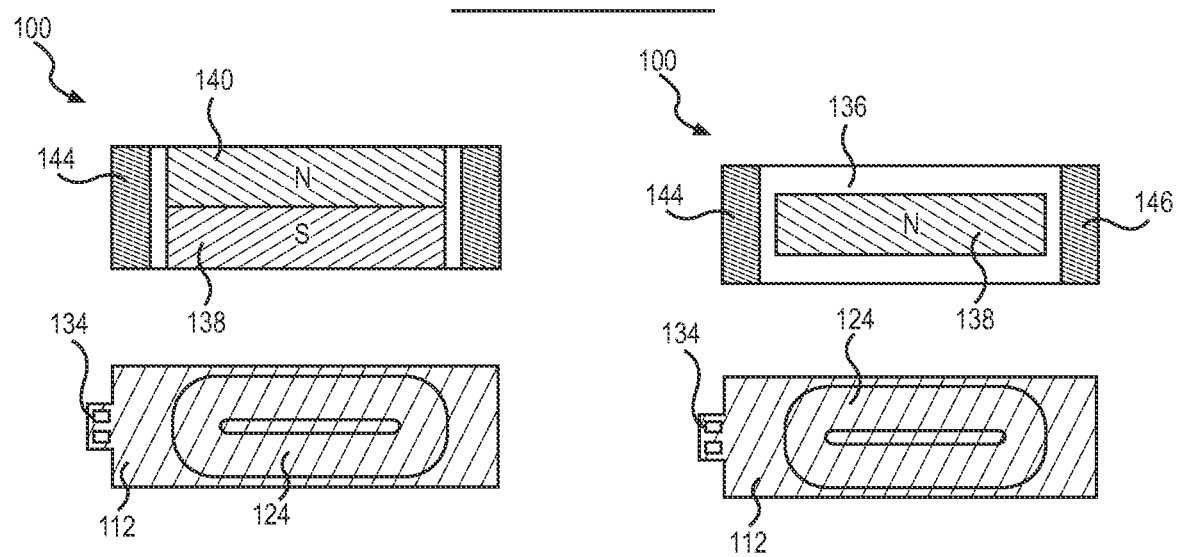
Figure 10D:
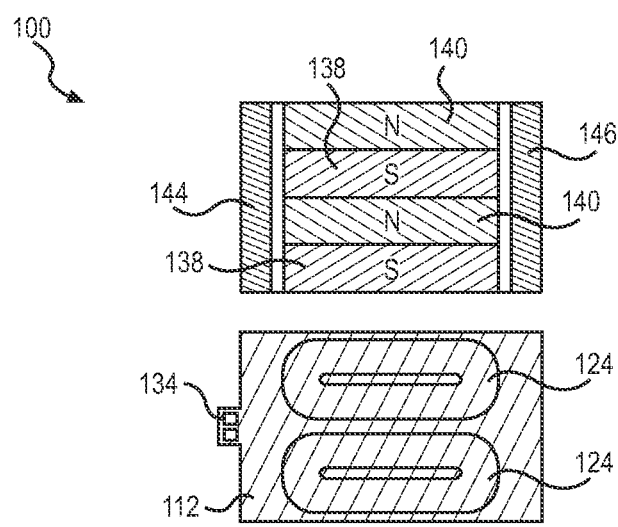
Figure 11A:
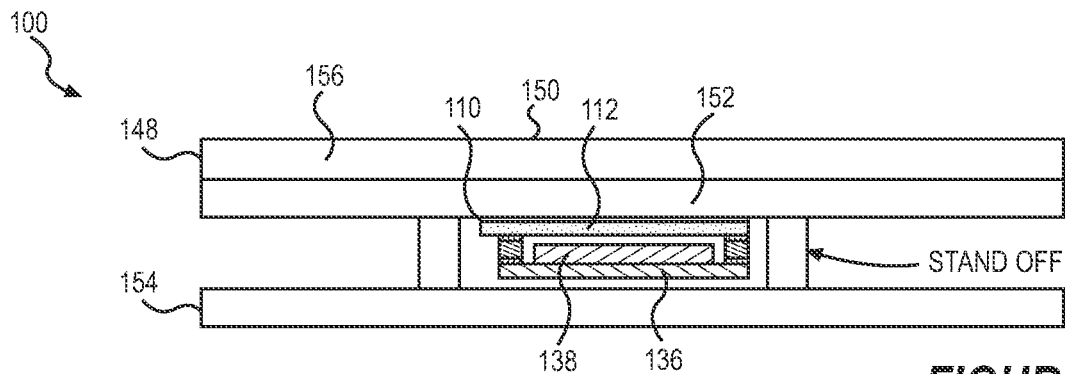
FIGS. 11A, 11B, 11C, and 11D are a schematic representation of the system.
Figure 11B:
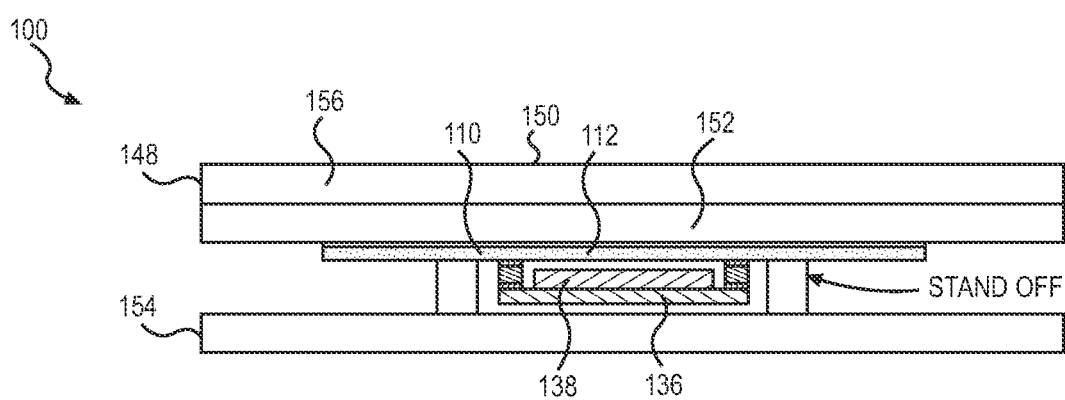
Figure 11C:
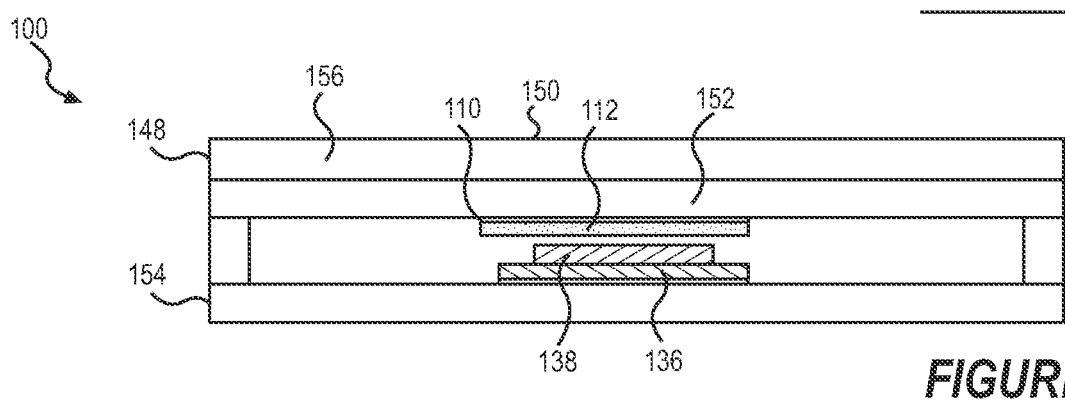
Figure 11D:
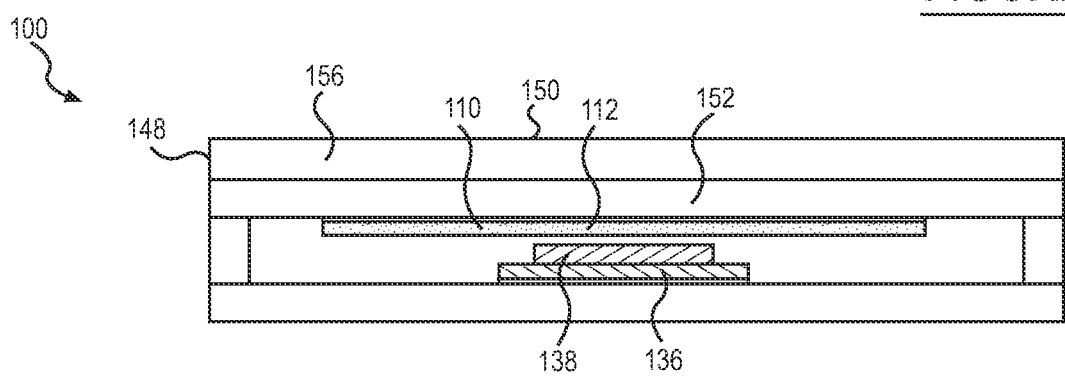
Figure 12A:
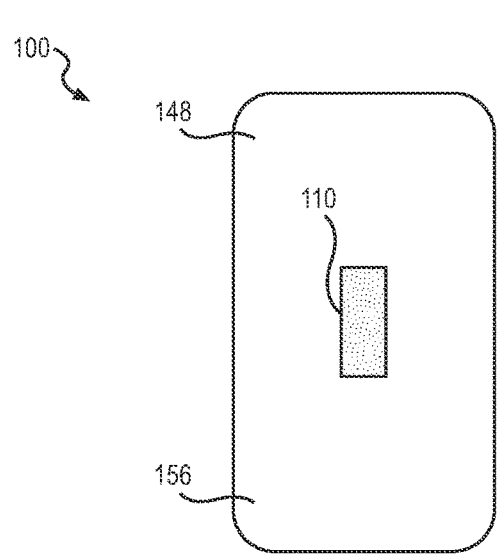
FIGS. 12A, 12B, 12C, 12D, 12E, and 12F are a schematic representation of the system.
Figure 12B:
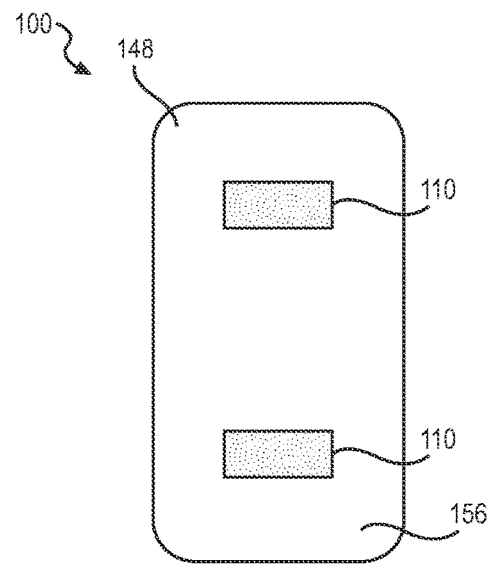
Figure 12C:
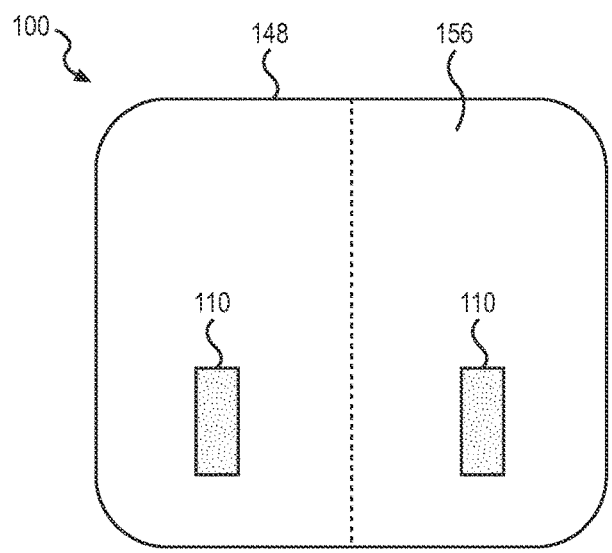
Figure 12D:
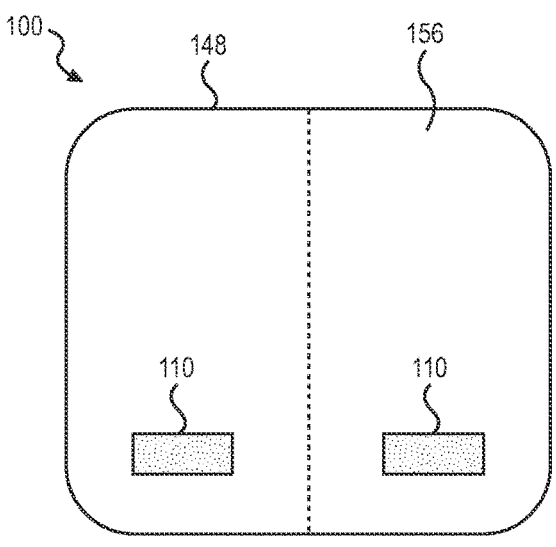
Figure 12E:
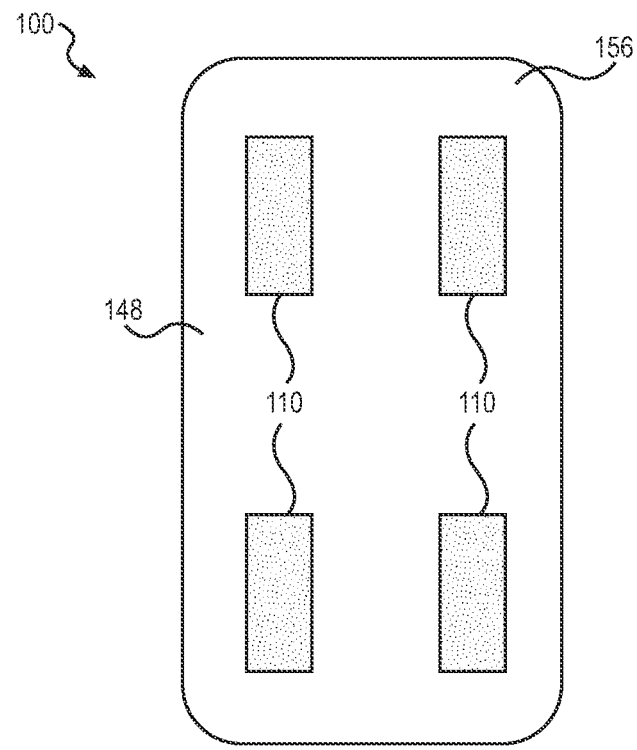
Figure 12F:
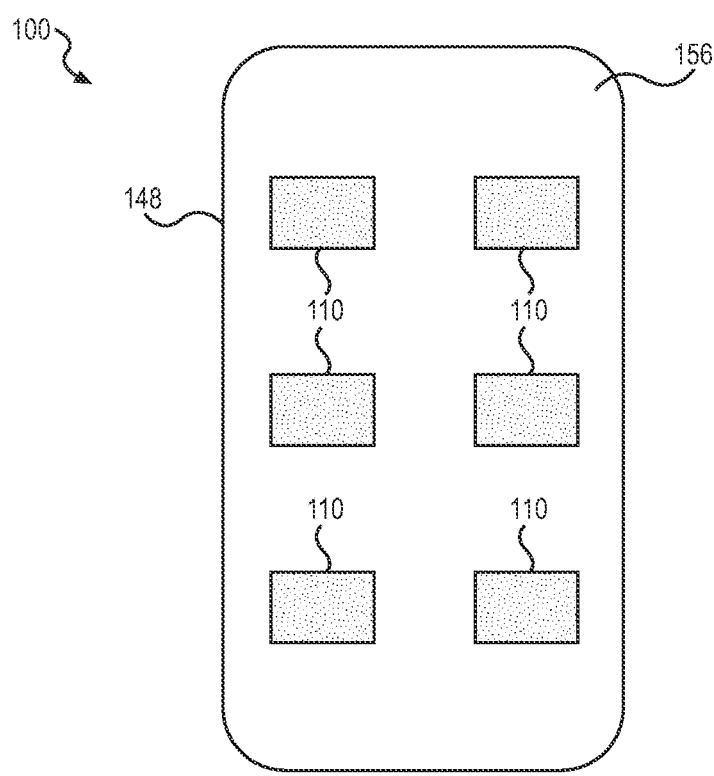
Figure 13A:
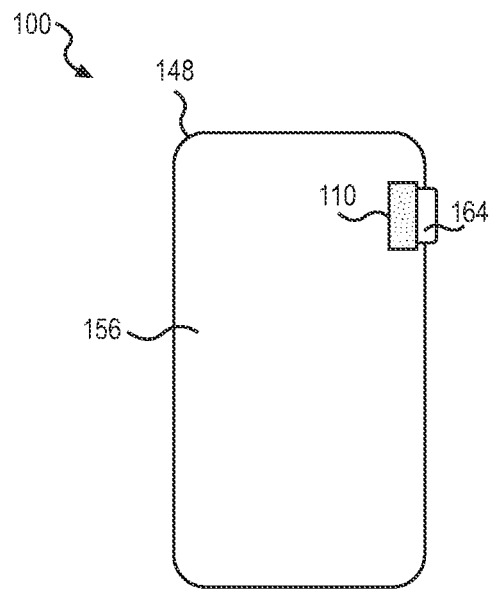
FIGS. 13A, 13B, 13C, 13D, and 13E are a schematic representation of the system.
Figure 13B:
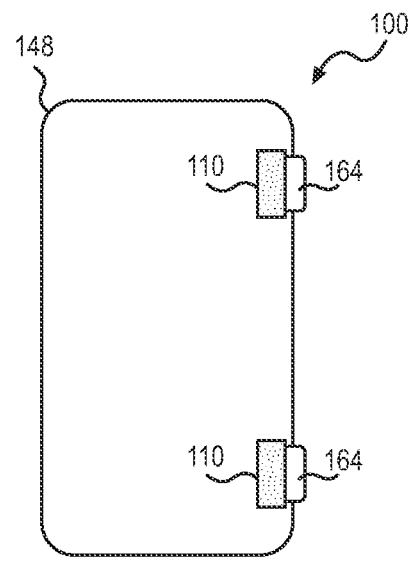
Figure 13C:
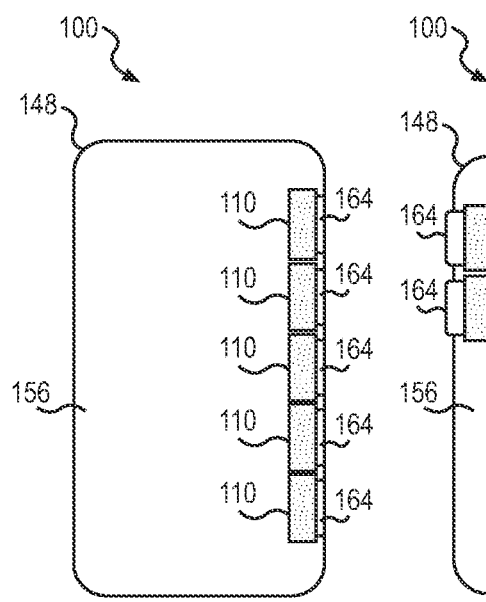
Figure 13D:
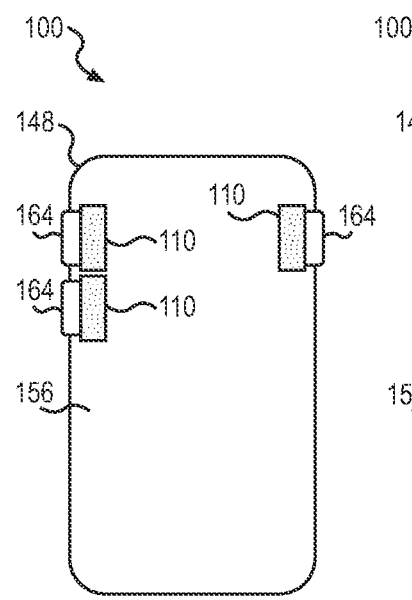
Figure 13E:
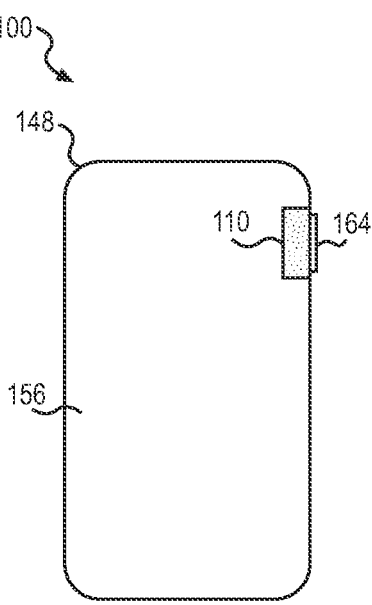
Figure 14:
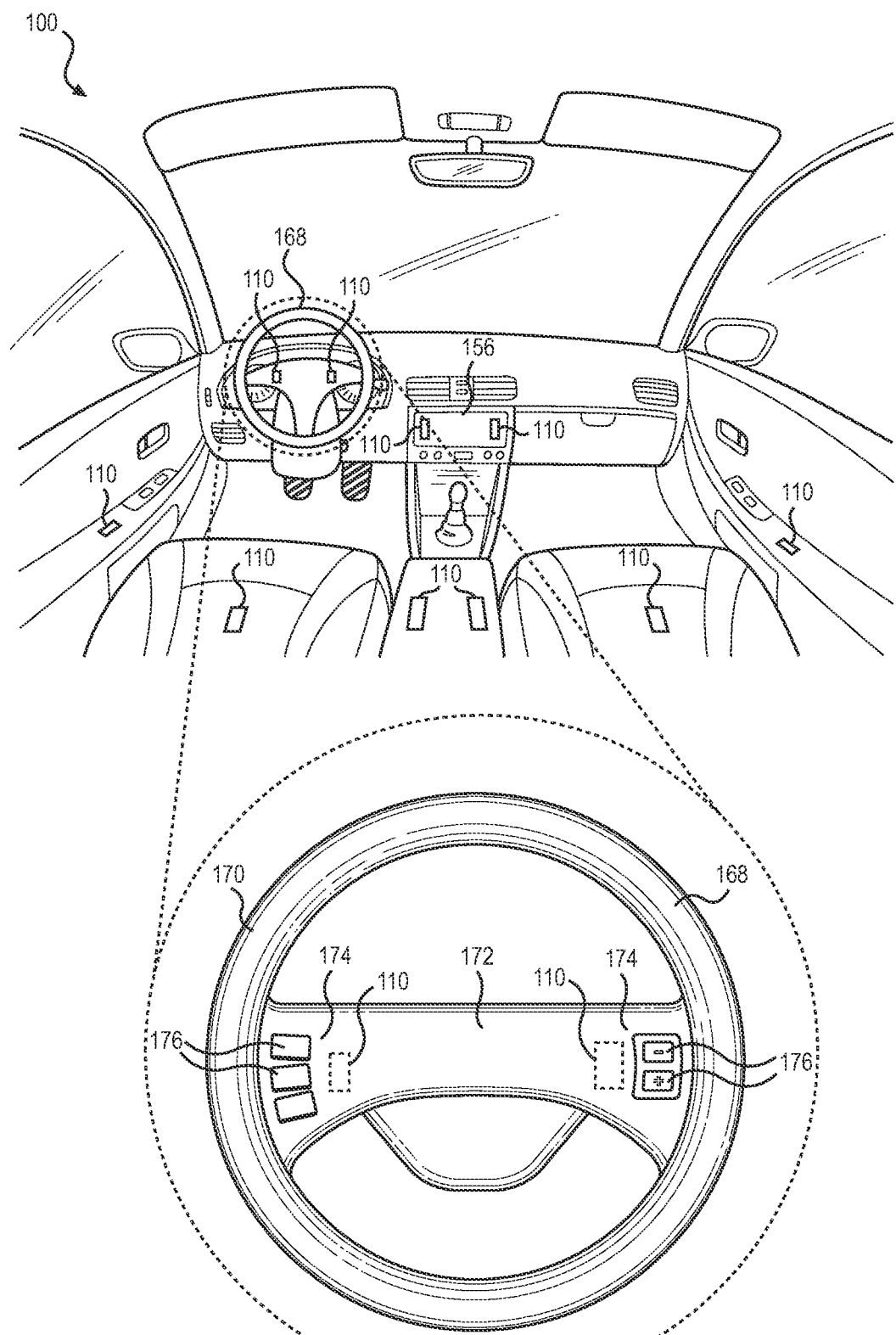
FIG. 14 is a schematic representation of the system.

As shown in FIGS. 1, 2 and 4, one variation of the system 100 for a haptic actuator 110 includes: a substrate 112; a baseplate 136; a first magnetic element 138; and a first set of spacer elements 142.

The substrate 112 includes: a first layer 116 including a first spiral trace 118 coiled in a first direction; and a second layer 120. The second layer 120: is arranged below the first layer 116; and includes a second spiral trace 122. The second spiral trace 122: is coiled in a second direction opposite the first direction; is coupled to the first spiral trace 118; and cooperates with the first spiral trace 118 to form a multi-layer inductor 124. The substrate 112 further includes a first set of terminals 134 arranged about a periphery of the substrate 112 and coupled to the first multi-layer inductor 124.

The baseplate 136 is arranged opposite the substrate 112. The first magnetic element 138: is arranged on the baseplate 136; defines a first polarity facing the first multi-layer inductor 124; and is configured to magnetically couple the multi-layer inductor 124 to oscillate the substrate 112 relative to the first magnetic element 138. The set of spacer elements 142: are interposed between the baseplate 136 and the substrate 112; are arranged proximal perimeter edges of the baseplate 136; and define a nominal gap between the first magnetic element 138 and the first multi-layer inductor 124.

Figure 3:
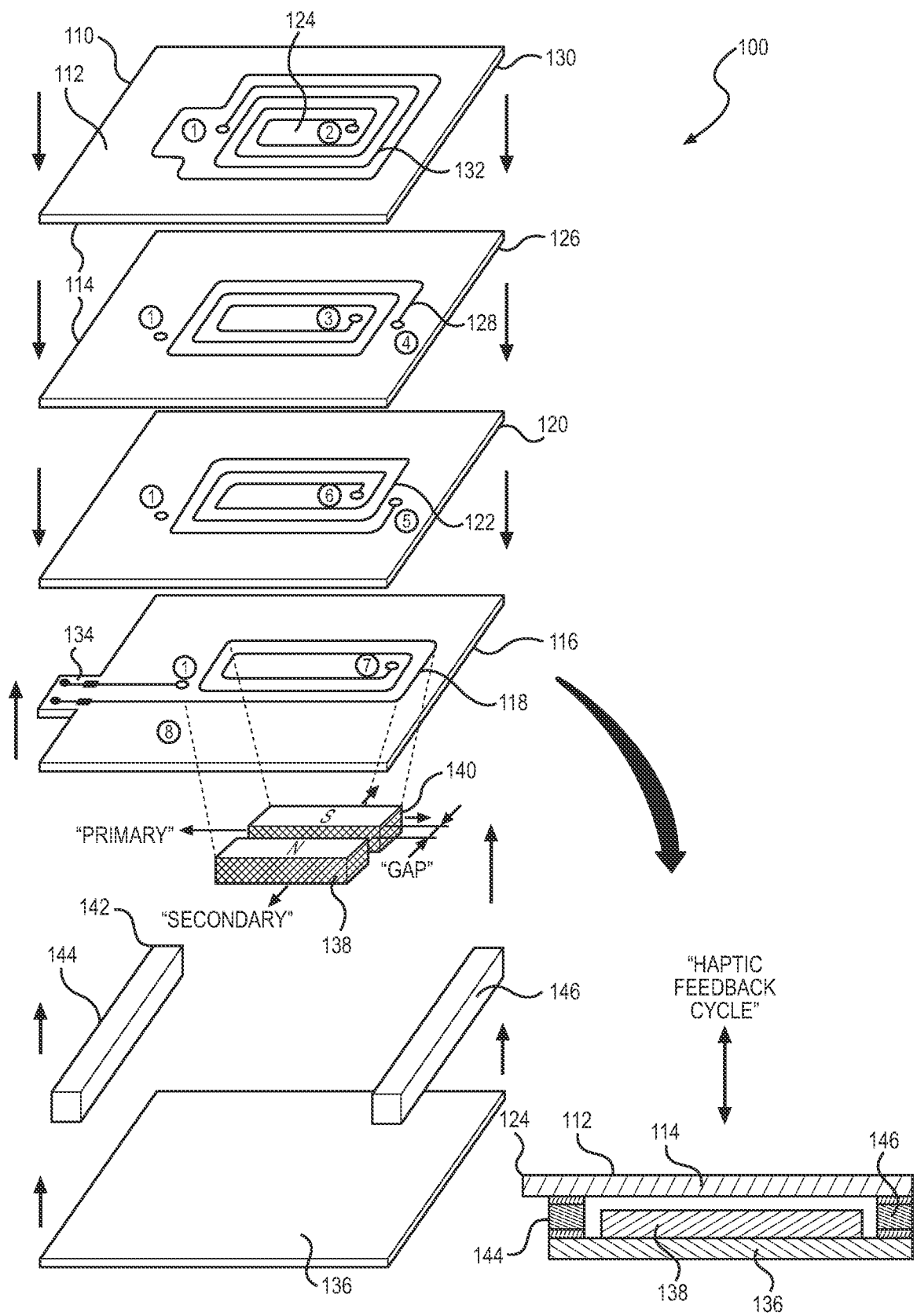
FIG. 3 is a schematic representation of the system.

As shown in FIG. 3, one variation of a system 100 for a haptic actuator 110 includes: a substrate 112; a baseplate 136; and a set of magnetic elements.

The substrate 112 includes: a first layer 116 including a first spiral trace 118 coiled in a first direction; and a second layer 120. The second layer 120: is arranged below the first layer 116; and includes a second spiral trace 122. The second spiral trace 122: is coiled in a second direction opposite the first direction; is coupled to the first spiral trace 118; and cooperates with the first spiral trace 118 to form a multi-layer inductor 124. The substrate 112 further includes a first set of terminals 134 arranged about a periphery of the substrate 112 and coupled to the first multi-layer inductor 124.

The baseplate 136 is arranged opposite the substrate 112. The first set of magnetic elements: are arranged on the baseplate 136; include a first magnetic element 138 and a second magnetic element 14o; and are configured to magnetically couple the first multi-layer inductor 124 to oscillate the substrate 112 parallel to the set of magnetic elements. The first magnetic element 138 defines a first polarity facing the multi-layer inductor 124. The second magnetic element 14o: is arranged adjacent the first magnetic element 138; and defines a second polarity, opposite the first polarity, facing the multi-layer inductor 124.

2. Applications

Generally, in this variation, a system 100 for a human-computer interface (e.g., a mobile device 148) includes: a touchscreen; a chassis 15o; a haptic actuator 110; and a controller 166. The chassis 150 includes: a middle frame 152; and a rear frame 154 offset below the middle frame 152 and cooperating with the middle frame 152 to define a vertical gap within the chassis 150. The haptic actuator 110 includes: a substrate 112 including a multi-layer inductor 124; and a first magnetic element 138 arranged within the vertical gap within the chassis 150.

In particular, the multi-layer inductor 124 and the first magnetic element 138 can cooperate to form a thin (e.g., 1.5 mm-thick) vibrator configured to oscillate the middle frame 152—and thus the touchscreen supported on the middle frame 152—and the rear frame 154 of the chassis 150, such as when driven by the controller 166 responsive to application of an input on the touchscreen. For example, the multi-layer inductor 124 can be formed by a thin (e.g., 0.25 mm-thick) set of planar coil traces etched or fabricated on multiple layers within the substrate 112 and interconnected by vias extending through these layers. These interconnected planar coil traces can thus form one continuous inductor with multiple turns, one or more cores, and/or one or more windings facing (e.g., adjacent, arranged over) the first magnetic element 138. The multi-layer inductor 124 can further include a set of terminals 134 connected to a set of planar coil traces and coupled to the controller 166. Furthermore, the first magnetic element 138 is arranged below the multi-layer inductor 124 to form the unitary vibrator within the chassis 150 of the mobile device 148.

In one example, the haptic actuator 110 includes a substrate 112 including: a first layer 116 including a first spiral trace 118 and bonded to a bottom side of the middle frame 152; and a second layer 120 including a second spiral trace 122 and bonded to a bottom side of the first layer 116 of the substrate 112. In this example, the first spiral trace 118 and the second spiral trace 122 of the substrate 112 cooperate to form the multi-layer inductor 124.

In another example, the system 100 can include a set of spacer elements 142: arranged proximal the multi-layer inductor 124 on the substrate 112; and vertically supporting the first magnetic element 138 below the multi-layer inductor 124. In particular, the set of spacer elements 142 can be bonded to a baseplate 136 (e.g., magnetic yoke) arranged over the multi-layer inductor 124, and the first magnetic element 138 can be rigidly coupled to this baseplate 136 facing the multi-layer inductor 124 of the substrate 112. In this example, the substrate 112, the set of spacer elements 142, the first magnetic element 138, and the baseplate 136 form a unitary haptic actuator 110 of a particular height cooperating with the constrained vertical gap within the chassis 150.

Therefore, the system 100 can include a haptic actuator 110 arranged within a height-constrained chassis 150 of a human-computer interface in order to deliver haptic feedback responses to a user interfacing with the human-computer interface, such as by delivering haptic feedback response to a palm of the user in contact with the rear frame 154 of the chassis 150, and/or delivering haptic feedback response to a finger of the user in contact with the touchscreen and/or one or more buttons 164 (e.g., mechanical buttons, virtual buttons, soft buttons) on the human-computer interface.

3. Touch Sensor

The system 100 can include the haptic actuator 110 coupled to a touch sensor, such as integrated in a mobile device 148, integrated in a trackpad module, and/or integrated at a steering wheel 168 for a vehicle, in order to deliver haptic feedback responsive to touch inputs detected at the touch sensor. In particular, the touch sensor: can be arranged below the cover layer 162 defining the touch sensor surface; and include a set of touch layers (e.g., rigid and/or flexible layers) that define the touch sensor. The set of touch layers can include: a top conductive layer and/or a second conductive layer, each including a set of traces that cooperate to form an array (e.g., grid array) of drive and sense electrode pairs 158 at the touch sensor. Thus, the system 100 can: read a set of electrical values from the touch sensor; and drive an oscillating voltage to the haptic actuator 110 in response to detecting a touch input on the touch sensor surface based on the set of electrical values.

3.1 Resistive Touch Sensor

In one implementation, the first and second conductive layers of the set of touch layers include columns of drive electrodes and rows of sense electrodes (or vice versa) that terminate in a grid array of drive and sense electrode pairs 158 on the top layer for the touch sensor. In this implementation, the system 100 further includes a force sensitive layer 16o: arranged over the top conductive layer of the set of touch layers (e.g., interposed between the top layer of the set of touch layers and the cover layer 162); and exhibiting local changes in contact resistance across the set of drive and sense electrode pairs 158 responsive to location application of forces on the cover layer 162 (i.e., on the touch sensor surface). Furthermore, the first haptic actuator no: can be coupled (e.g., bonded) to a bottom surface of the second conductive layer in the set of touch layers; and is configured to oscillate the touch sensor surface responsive to touch inputs detected on the touch sensor surface.

Accordingly, during a scan cycle, the controller 166 can: serially drive the columns of drive electrodes; serially read electrical values—(e.g., voltages) representing electrical resistances across drive and sense electrode pairs 158—form the rows of sense electrodes; detect a first touch input at a first location (e.g., an (x, y) location) on the touch sensor surface based on deviation of electrical values—read from a subset of drive and sense electrode pairs 158 adjacent the first location—from baseline resistance based electrical values stored for this subset of drive and sense electrode pairs 158; and interpret a force magnitude of the first touch input based on a magnitude of this deviation. As described below, the controller 166 can then drive an oscillating voltage across the multi-layer inductor 124 in the substrate 112 during a haptic feedback cycle in response to the force magnitude of the first touch input exceeding a threshold input force.

The array of drive and sense electrode pairs 158 on the first and second conductive layers of the set of touch layers and the force sensitive layer 16o can thus cooperate to form a resistive touch sensor readable by the controller 166 to detect lateral positions, longitudinal positions, and force (or pressure) magnitudes of inputs (e.g., fingers, styluses, palms) on the touch sensor surface.

3.2 Capacitive Touch Sensor

In another implementation, the first and second conductive layers in the set of touch layers include columns of drive electrodes and rows of sense electrodes (or vice versa) that terminate in a grid array of drive and sense electrode pairs 158 on the top conductive layer in the set of touch layers.

During a scan cycle, the controller 166 can: serially drive the columns of drive electrodes; serially read electrical values (e.g., voltage, capacitance rise time, capacitance fall time, resonant frequency)—representing capacitive coupling between drive and sense electrode pairs 158—from the rows of sense electrodes; and detect a first input at a first location (e.g., an (x, y) location) on the touch sensor surface based on deviation of electrical values—read from a subset of drive and sense electrode pairs 158 adjacent the first location—from baseline capacitance-based electrical values stored for this subset of drive and sense electrode pairs 158. For example, the controller 166 can implement mutual capacitance or self-capacitance techniques to read capacitance values between these drive and sense electrode pairs 158 and to interpret inputs on the touch sensor surface based on these capacitance values.

The array of drive and sense electrode pairs 158 on the first and second conductive layers of the substrate 112 and the force-sensitive layer can thus cooperate to form a capacitive touch sensor readable by the controller 166 to detect lateral and longitudinal positions of inputs (e.g., fingers, styluses, palms) on the touch sensor surface.

3.3 Touchscreen

In one implementation, the system 100 includes a touchscreen, such as a touchscreen display 156 integrated into a chassis 150 of a mobile computing device, including: a display 156 element (e.g., rigid LED display 156, flexible OLED display 156); a set of drive and sense electrode pairs 158 arranged across the display 156; and a cover layer 162 (e.g., glass layer) arranged over the touch sensor and defining a touch sensor surface. For example, the system 100 can include a double-sided PET layer defining a top side and a bottom side including (e.g., etched) a set of drive and sense electrode pairs 158. In another example, the system 100 can include a printed layer defining a top side and a bottom side including the set of drive and sense electrode pairs 158.

During a scan cycle, the controller 166 can: serially drive the columns of drive electrodes in the set of set of drive and sense electrode pairs 158; serially read electrical values (e.g., voltage, capacitance rise time, capacitance fall time, resonant frequency)—representing capacitive coupling between drive and sense electrode pairs 158— from the rows of sense electrodes in the set of set of drive and sense electrode pairs 158; and detect a touch input at a first location (e.g., an (x, y) location) on the touch sensor surface based on deviation of electrical values—read from a subset of drive and sense electrode pairs 158 adjacent the first location—from baseline capacitance-based electrical values stored for this subset of drive and sense electrode pairs 158. For example, the controller 166 can implement mutual capacitance techniques to read capacitance values between these drive and sense electrode pairs 158 and to interpret touch inputs on the touch sensor surface based on these capacitance values. The controller 166 can thus drive the oscillating voltage across the multi-layer inductor 124 to trigger a haptic feedback cycle in response to the touchscreen detecting the touch input on the touch sensor surface.

Therefore, the system 100 can: receive or integrate with the touchscreen (i.e., an integrated display 156 and touch sensor); and cooperate with the first magnetic element 138 and the controller 166 to vibrate the touch sensor surface over the touchscreen responsive to a touch input on the touch sensor surface, such as detected by a controller 166 coupled to the touchscreen.

In one implementation, the system 100 can include a touchscreen including a set of force sensor layers arranged below the display 156 element. The set of sensor layers includes: a first force layer (e.g., a second double sided print arranged on a second PET layer) including a first set of sensor traces (e.g., sense electrodes); and a second force layer arranged within the chassis 150 including a second set of sensor traces (e.g., drive electrodes) in alignment with the first set of sensor traces thereby forming the force sensor. In this implementation, the system 100 100 can further include a set of deflection spacers: arranged below the set of force sensor layers; and coupled to a set of support locations defined along a bottom side of the touchscreen. The system 100 can thus: read a set of electrical values from the first set of sensor traces; and interpret a force magnitude of an input applied on the touch sensor surface based on deviations of the set of electrical values from baseline electrical values.

4. Haptic Actuator

Generally, the system 100 can include a haptic actuator 110 including: a substrate 112 defining a multi-layer inductor 124; and a first magnetic element 138 cooperating with the multi-layer inductor 124 to form a thin (e.g., 1.3 mm to 1.6 mm-thick) unitary haptic actuator 110 arranged within a chassis 150 of a mobile device 148. In particular, the haptic actuator 110 can be integrated into a computing device, such as a trackpad module, a smart watch, a laptop device, in order to deliver haptic feedback responsive to touch inputs received at the computing device. Additionally or alternatively, the haptic actuator 110 can also be integrated into non-computing devices, such as wristbands, steering wheels 168, and/or arm rests, and coupled to an external controller 166 in order to deliver haptic feedback at the non-computing devices responsive to haptic feedback cycles executed by the external controller 166.

4.1 Multi-Layer Inductor

The system 100 includes a multi-layer inductor 124 formed by a set of interconnected spiral traces fabricated within a set of conductive layers within the substrate 112 of the haptic actuator 110. Generally, the total inductance of a single spiral trace may be limited by the thickness of the conductive layer. Therefore, the system 100 can include a stack of overlapping, interconnected spiral traces fabricated on a set of adjacent layers of the substrate 112 to form a multi-layer, multi-turn, and/or multi-core inductor that exhibits greater inductance—and therefore greater magnetic coupling to the set of magnetic elements—than a single spiral trace on a single conductive layer of the substrate 112. These spiral traces can be coaxially aligned about a common vertical axis (e.g., centered over the set of magnetic elements) and electrically interconnected by a set of vias through the intervening conductive layers of the substrate 112.

Furthermore, the substrate 112 can include conductive layers of different thicknesses. Accordingly, spiral traces within thicker conductive layers of the substrate 112 can be fabricated with narrower trace widths and more turns, and spiral traces within thinner conductive layers of the substrate 112 can be fabricated with wider trace widths and fewer turns in order to achieve similar electrical resistances within each spiral trace over the same coil footprint. For example, lower conductive layers within the substrate 112 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 124 and the set of magnetic elements during a haptic feedback cycle.

4.1.1 Single Core+Even Quantity of Coil Layers

In one implementation shown in FIG. 1, the substrate 112 can include: a set of (e.g., two) conductive layers (e.g., flexible or rigid PCBA layers) etched to form a set of conductive traces; and a set of vias that connect the set of conductive traces across the set of conductive layers. In particular, the substrate 112 can include an even quantity of spiral traces fabricated within an even quantity of substrate layers within the substrate 112 to form a thin (e.g., 0.20 mm to 0.30 mm-thick) single-coil inductor.

For example, the substrate 112 can include a set of inductor layers 114 including a first layer 116 and a second layer 120. In this example, the first layer 116 includes a first spiral trace 118 coiled in a first direction and defining a first end and a second end. In particular, the first spiral trace 118 can define a first planar coil spiraling inwardly in a clockwise direction from the first end at a periphery of the first planar coil to the second end proximal a center for the first planar coil. The second layer 120 includes a second spiral trace 122 coiled in a second direction opposite the first direction and defining a third end—electrically coupled to the second end of the first spiral trace 118—and a fourth end. In particular, the second spiral trace 122 can define a second planar coil spiraling outwardly in the clockwise direction from the third end proximal the center of the second planar coil to the fourth end at a periphery of the second planar coil.

Accordingly: the second end of the first spiral trace 118 can be coupled to the third end of the second spiral trace 122 by a first via; and the first spiral trace 118 and the second spiral trace 122 can cooperate to form a single-core, two-layer inductor. The controller 166: can be electrically connected (e.g., solder pads, ribbon cable, surface mounted) to the first end of the first spiral trace 118 and the fourth end of the second spiral trace 122; and can drive these terminals of the multi-layer inductor 124 with an oscillating voltage during a haptic feedback cycle in order to induce an alternating magnetic field through the multi-layer inductor 124, which couples the magnetic elements and oscillates the substrate 112 and therefore the cover layer 162 of the touchscreen arranged on the chassis 150. In particular, when the controller 166 drives the multi-layer inductor 124 at a first polarity, current can flow in a continuous, clockwise direction through the first spiral trace 118 and the second spiral trace 122 to induce a magnetic field in a first direction around the multi-layer inductor 124. When the controller 166 reverses the polarity across terminals of the multi-layer inductor 124, current can reverse directions and flow in a continuous, counter-clockwise direction through the first spiral trace 118 and the second spiral trace 122 to induce a magnetic field in a second, opposite direction at the multi-layer inductor 124.

Furthermore, in this implementation, the first end of the first spiral trace 118 can define a first terminal of the multi-layer inductor 124 and the second end of the second spiral trace 122 can define a second terminal of the multi-layer inductor 124. The first terminal and the second terminal can be located on a periphery of the first layer 116 and the second layer 120 of the substrate 112 and thus enable direct connection to the controller 166 independent from the touch sensor.

In the aforementioned example, the substrate 112 can further include: a third layer 126 including a third spiral trace 128; and a fourth layer 130 including a fourth spiral trace 132 in order to increase total inductance of the multi-layer inductor 124. In this example, the third layer 126 includes a third spiral trace 128 coiled in the first direction and defining a fifth end—electrically coupled to the fourth end of the second spiral trace 122—and a sixth end. In particular, the third spiral trace 128 can define a third planar coil spiraling inwardly in the clockwise direction from the fifth end at the periphery of the third planar coil to the sixth end proximal a center of the third planar coil. Furthermore, the fourth layer 130 includes a fourth spiral trace 132 coiled in the second direction and defining a seventh end—electrically coupled to the sixth end of the first spiral trace 118—and an eighth end. In particular, the fourth spiral trace 132 can define a fourth planar coil spiraling outwardly in the clockwise direction from the seventh end proximal the center of the fourth planar coil to the eighth end at a periphery of the fourth planar coil.

Accordingly: the second end of the first spiral trace 118 can be coupled to the third end of the second spiral trace 122 by a first via; the fourth end of the second spiral trace 122 can be coupled to the fifth end of the third spiral trace 128 by a second via; the sixth end of the third spiral trace 128 can be coupled to the seventh end of the fourth spiral trace 132 by a third via; and the first, second, third, and fourth spiral traces, can cooperate to form a single-core, four-layer inductor. The controller 166 (or a driver): can be electrically connected to the first end of the first spiral trace 118 and the eighth end of the fourth spiral trace 132 (or "terminals" of the multi-layer inductor 124); and can drive these terminals of the multi-layer inductor 124 with an oscillating voltage during a haptic feedback cycle in order to induce an alternating magnetic field through the multi-layer inductor 124, which couples to the magnetic elements and oscillates the substrate 112. In particular, when the controller 166 drives the multi-layer inductor 124 at a first polarity, current can flow in a continuous, clockwise direction through the first, second, third, and fourth spiral traces to induce a magnetic field in a first direction around the multi-layer inductor 124. When the controller 166 reverses the polarity across terminals of the multi-layer inductor 124, current can reverse directions and flow in a continuous, counter-clockwise direction through the first, second, third, and fourth spiral traces to induce a magnetic field in a second, opposite direction at the multi-layer inductor 124.

Furthermore, in this implementation, because the multi-layer inductor 124 spans an even quantity (e.g., 2, 4) of conductive layers within the substrate 112, the terminals of the multi-layer inductor 124 can be located on the peripheries of the first and last layers of the substrate 112 and thus enable direct connection to the controller 166 (or driver).

4.1.2 Single Core+Odd Quantity of Coil Layers

In another implementation shown in FIG. 2, the multi-layer inductor 124 spans an odd number of (e.g., 3) conductive layers of the substrate 112. In this implementation, a conductive layer of the substrate 112 can include two parallel and offset spiral traces that cooperate with other spiral traces in the multi-layer inductor 124 to locate the terminals of the multi-layer inductor 124 at the periphery of the multi-layer inductor 124 for direct connection to the controller 166 or driver.

In this example, the first inductive layer includes a first spiral trace 118 coiled in a first direction and defining a first end and a second end. In particular, the first spiral trace 118 can define a first planar coil spiraling inwardly in a clockwise direction from the first end at the periphery of the first planar coil to the second end proximal a center of the first planar coil. The second inductive layer includes a second spiral trace 122 coiled in a second direction opposite the first direction and defining a third end—electrically coupled to the second end of the first spiral trace 118 in the third layer 126— and a fourth end. In particular, the second spiral trace 122 can define a second planar coil spiraling outwardly in the clockwise direction from the third end proximal the center of the second planar coil to the fourth end at a periphery of the second planar coil.

The first inductive layer further includes a third spiral trace 128 coiled in the first direction and defining a fifth end—electrically coupled to the fourth end of the second spiral trace 122 in the second layer 120—and a sixth end. In particular, the third spiral trace 128 can define a third planar coil: spiraling inwardly in the clockwise direction from the fifth end at the periphery of the third planar coil to the sixth end proximal a center of the third planar coil; and nested within the first planar coil that also spirals inwardly in the clockwise direction within the first layer 116.

Furthermore, a third layer 126 includes a fourth spiral trace 132 coiled in the second direction and defining a seventh end—electrically coupled to the sixth end of the first spiral trace 118—and an eighth end. In particular, the fourth spiral trace 132 can define a fourth planar coil spiraling outwardly in the clockwise direction from the seventh end proximal the center of the fourth planar coil to the eighth end at a periphery of the fourth planar coil.

Accordingly: the second end of the first spiral trace 118 within the first layer 116 can be coupled to the third end of the second spiral trace 122 within the second layer 120 by a first via; the fourth end of the second spiral trace 122 within the second layer 120 can be coupled to the fifth end of the third spiral trace 128 within the first layer 116 by a second via; the sixth end of the third spiral trace 128 within the first layer 116 can be coupled to the seventh end of the fourth spiral trace 132 within the third layer 126 by a third via; and the first, second, third, and fourth spiral traces can cooperate to form a single-core, three-layer inductor. The controller 166: can be electrically connected to the first end of the first spiral trace 118 within the first layer 116 and the eight end of the fourth spiral trace 132 within the third layer 126 (or "terminals" of the multi-layer inductor 124); and can drive these terminals of the multi-layer inductor 124 with an oscillating voltage during a haptic feedback cycle in order to induce an alternating magnetic field through the multi-layer inductor 124, which couples to the magnetic elements and oscillates the substrate 112. In particular, when the controller 166 drives the multi-layer inductor 124 at a first polarity, current can flow in a continuous, clockwise direction through the first, second, third, and fourth spiral traces within the second, third, and fourth layers 130 of the substrate 112 to induce a magnetic field in a first direction around the multi-layer inductor 124. When the controller 166 reverses the polarity across terminals of the multi-layer inductor 124, current can reverse directions and flow in a continuous, counter-clockwise direction through the first, second, third, and fourth spiral traces to induce a magnetic field in a second, opposite direction at the multi-layer inductor 124.

Therefore, in this implementation, the substrate 112 can include an even number of single-coil layers and an odd number of two-coil layers selectively connected to form a multi-layer inductor 124 that includes two terminals located on the periphery of the multi-layer inductor 124.

4.1.3 Double Core+Even Quantity of Coil Layers

In another implementation shown in FIG. 4, the substrate 112 includes an even quantity of spiral traces fabricated within an even quantity of substrate layers within the substrate 112 to form a dual-core inductor (i.e., two separate single-core inductors connected in series).

In this example, the first layer 116 includes a first spiral trace 118 coiled in a first direction and defining a first end and a second end. In particular, the first spiral trace 118 can define a first planar coil spiraling inwardly in a clockwise direction from the first end at the periphery of the first planar coil to the second end proximal a center of the first planar coil. The second layer 120 includes a second spiral trace 122 coiled in a second direction opposite the first direction and defining a third end—electrically coupled to the second end of the first spiral trace 118—and a fourth end. In particular, the second spiral trace 122 can define a second planar coil spiraling outwardly in the clockwise direction from the third end proximal the center of the second planar coil to the fourth end at a periphery of the second planar coil. Accordingly: the second end of the first spiral trace 118 can be coupled to the third end of the second spiral trace 122 by a first via; and the first and second spiral traces 122 can cooperate to form a first single-core, four-layer inductor.

Additionally, in this example, the first layer 116 also includes a third spiral trace 128: arranged adjacent the first spiral trace 118; coiled in the second direction; and defining a fifth end and a sixth end, the fifth end electrically coupled to the first end of the first spiral trace 118. Furthermore, the second layer 120 also includes a fourth spiral trace 132: arranged adjacent the second spiral trace 122; coiled in the first direction; defining a seventh end and an eighth end; and cooperating with the third spiral trace 128 to form a second multi-layer inductor. The seventh end is electrically coupled to the sixth end of the third spiral trace 128 and the eighth end defines a third terminal in the first set of terminals 134.

The controller 166: can be electrically connected to the set of terminals 134 and can drive these terminals with an oscillating voltage during a haptic feedback cycle in order to induce: a first alternating magnetic field through the first single-core, two-layer inductor (formed by the first and second spiral trace 122s); and a second alternating magnetic field—in phase with the first alternating magnetic field—through the second single-core, two-layer inductor (formed by the third and fourth spiral traces). In particular, when the controller 166 drives the two-layer, dual-core inductor at a first polarity, current can flow: in a continuous, clockwise direction through the first and second spiral traces 122 to induce a magnetic field in a first direction around the first single-core, two-layer inductor; and in a continuous, clockwise direction through the fourth and fifth spiral traces to induce a magnetic field in the first direction around the second single-core, two-layer inductor.

4.1.4 Double Core+Odd Quantity of Coil Layers

In a similar implementation, the substrate 112 includes an odd quantity of spiral traces fabricated within an odd quantity of substrate layers within the substrate 112 to form a dual-core inductor. For example, the dual-core inductor can include two single-coil, three-layer inductors connected in series. In this example, each single-coil, three-layer inductor includes: an even number of single-coil layers; and an odd number of two-coil layers selectively connected to form a single-coil, three-layer inductor that includes two terminals located on the periphery of the single-coil, three-layer inductor, as described above.

4.2 Magnetic Element

In one implementation, the system 100 includes: a baseplate 136 (e.g., a magnetic ferrous yoke) arranged below the substrate 112; the first magnetic element 138 rigidly coupled to the baseplate 136 and facing the multi-layer inductor 124; and a set of spacer elements 142 vertically supporting the baseplate 136—and therefore the magnetic element—below the substrate 112 to form a unitary haptic actuator 110 configured to transfer lateral and/or vertical oscillating forces to the chassis 150 and the touchscreen. In particular, the spiral traces within the multi-layer inductor 124 can span a coil footprint, such as a rectangular or ellipsoidal footprint including: long sides parallel to a primary axis of the multi-layer inductor 124; and short sides parallel to a secondary axis of the multi-layer inductor 124.

In one example, the system 100 includes a set of spacer elements 142 including: a first spacer bonded to a bottom side of the substrate 112; arranged about a first short side of the substrate 112; extending a particular height (e.g., 0.90 mm to 1.10 mm) below the substrate 112; and bonded to an upper side of the baseplate 136. Additionally, in this example, the system 100 includes: a second spacer bonded to the bottom side of the substrate 112; arranged about a second short side, opposite the first short side, of the substrate 112; extending the particular height below the substrate 112; and bonded to the upper side of the baseplate 136 to form a nominal gap (e.g., 0.20 mm to 0.30 mm-gap) between the multi-layer inductor 124 and the first magnetic element 138. The first spacer and the second spacer cooperate with baseplate 136 to locate the first magnetic element 138 facing the multi-layer inductor 124 and thus forming a unitary haptic actuator 110 of a thin (e.g., 1.3 mm to 1.6 mm-thick) profile located within the chassis 150 of the mobile device 148. Furthermore, the set of spacer elements 142 are formed of a low-durometer or elastic material that deflects laterally (or "shears") to enable the substrate 112 to translate laterally within the chassis 150 responsive to alternating magnetic coupling between the multi-layer inductor 124 and the first magnetic element 138s during a haptic feedback cycle.

4.2.1 Vertical Oscillation

In one implementation, the first magnetic element 138 is arranged relative to the multi-layer inductor 124 in order to induce an oscillating force—between the multi-layer inductor 124 and the first magnetic element 138—normal to the touch sensor surface such that the substrate oscillates vertically within the chassis 150 during a haptic feedback cycle.

In this implementation, the system 100 can include: the first magnetic element 138: arranged within the chassis 150 of a mobile device 148; defining a first magnetic polarity facing the multi-layer inductor 124; approximately centered under the multi-layer inductor 124; and extending laterally across the primary axis of the multi-layer inductor 124. The first magnetic element 138 can thus generate a magnetic field that extends predominantly vertically toward the multi-layer inductor 124 and that is approximately centered under the multi-layer inductor 124. More specifically, the first magnetic element 138 can generate a magnetic field that extends predominantly normal to the touchscreen proximal the center of the multi-layer inductor 124. The controller 166 can then drive the multi-layer inductor 124 to a positive voltage during a haptic feedback cycle, and the multi-layer inductor 124 can generate a magnetic field that extends vertically through the substrate 112 in a first vertical direction, which: repels the first magnetic element 138 (arranged with the first polarity facing the multi-layer inductor 124); and yields a first vertical force in a first vertical direction. When the controller 166 then reverses the voltage across the multi-layer inductor 124 during this haptic feedback cycle, the multi-layer inductor 124 can generate a magnetic field that extends vertically through the substrate 112 in a second, opposite vertical direction, which: attracts the first magnetic element 138; yields a second vertical force in a second, opposite vertical direction; and draws the substrate 112 downward and back toward the first magnetic element 138.

Therefore, by oscillating the polarity of the multi-layer inductor 124, the controller 166 can: induce oscillating interactions (i.e., alternating attractive and repelling forces) normal to the touchscreen between the multi-layer inductor 124 and the first magnetic element 138; and thus oscillate the substrate 112—and thus the touchscreen—vertically (e.g., normal to the middle frame 152 and the rear frame 154 of the chassis 150).

4.2.2 Vertical Oscillation: Dual-core Multi-Layer Inductor

In this implementation the system 100 includes the substrate 112 including two adjacent single-core, multi-layer inductors connected in series and in phase (i.e., phased by 0°), and a first magnetic element 138: defining a first magnetic polarity facing the first single-core multi-layer inductor 124; approximately centered under the first single-core multi-layer inductor 124; and extending laterally across the primary axis of the first single-core multi-layer inductor 124. The system 100 can similarly include a second magnetic element 140: arranged adjacent the first magnetic element 138; defining the first magnetic polarity facing the second single-core multi-layer inductor 124; approximately centered under the second single-core multi-layer inductor 124; and extending laterally across the primary axis of the second single-core multi-layer inductor 124.

4.2.3 Horizontal Oscillation

In another implementation, as described above, the system 100 can be configured for horizontal oscillations of the touchscreen by exchanging the first magnetic element 138 that spans the width of and is centered under the multi-layer inductor 124 for a pair of opposing magnetic elements arranged under the multi-layer inductor 124, and on each of the primary axis of the multi-layer inductor 124.

In this implementation, the system 100 can include a first magnetic element 138: arranged within the chassis 150 of the mobile device 148; defining a first magnetic polarity facing the multi-layer inductor 124; and extending along a first side of the primary axis. In this implementation, the system 100 can similarly include a second magnetic element 140: arranged within the chassis 150 of the mobile device 148; defining a second magnetic polarity facing the multi-layer inductor 124; and extending along a second side of the primary axis adjacent the first magnetic element 138. In particular, the first magnetic element 138 can be arranged immediately adjacent and the second magnetic element 140. The first and second magnetic element 140s can be arranged directly under the multi-layer inductor 124 and can face the multi-layer inductor 124 with opposing polarities. When the controller 166 drives the multi-layer inductor 124 with an alternating voltage (or current), the multi-layer inductor 124 can generate a magnetic field that extends vertically through the substrate 112 (e.g., normal to the substrate 112) and interacts with the opposing magnetic fields of the first and second magnetic element 140s. More specifically, when the controller 166 drives the multi-layer inductor 124 to a positive voltage during a haptic feedback cycle, the multi-layer inductor 124 can generate a magnetic field that extends vertically through the substrate 112 in a first vertical direction, which: attracts the first magnetic element 138 (arranged with the first polarity facing the multi-layer inductor 124); repels the second magnetic element 140 (arranged with the second polarity facing the multi-layer inductor 124); yields a first lateral force in a first lateral direction; and shifts the substrate 112 laterally in the first lateral direction. When the controller 166 then reverses the voltage across the multi-layer inductor 124 during this haptic feedback cycle, the multi-layer inductor 124 can generate a magnetic field that extends vertically through the substrate 112 in the opposing vertical direction, which: repels the first magnetic element 138; attracts the second magnetic element 140; yields a second lateral force in a second, opposite lateral direction; and shifts the substrate 112 laterally in the second lateral direction.

. Therefore, by oscillating the polarity of the multi-layer inductor 124, the controller 166 can: induce oscillating interactions (i.e., alternating attractive and repelling forces)—parallel to the touchscreen—between the multi-layer inductor 124 and the magnetic elements; and thus oscillate the substrate 112 and the touchscreen horizontally.

4.2.4 Horizontal Oscillation: Dual-Core Multi-Layer Inductor

In one implementation, the system 100 includes: the substrate 112 including two adjacent single-core, multi-layer inductors connected in series; and a first magnetic element 138 defining a first magnetic polarity facing the first single-core multi-layer inductor 124, and extending along a first side of a first primary axis of the first single-core multi-layer inductor 124; a second magnetic element 140 defining a second magnetic polarity facing the first single-core multi-layer inductor 124, and extending along a second side of the first primary axis adjacent the first magnetic element 138; a third magnetic element defining the second magnetic polarity facing the second single-core multi-layer inductor 124, and extending along a first side of a second primary axis of the second single-core multi-layer inductor 124; and a fourth magnetic element defining the first magnetic polarity facing the second single-core multi-layer inductor 124, and extending along a second side of the second primary axis adjacent the third magnetic element.

Accordingly, by oscillating the polarity of the first and second single-core multi-layer inductors 124—which include traces that spiral in the same direction and are therefore in phase—the controller 166 can: induce oscillating interactions parallel to the substrate 112 between the first single-core multi-layer inductor 124, the first magnetic element 138, and the second magnetic element 140 and between the second single-core multi-layer inductor 124, the third magnetic element, and the fourth magnetic element; and thus oscillate the substrate 112 horizontally.

4.3 Waterproofing

In one implementation, the system 100 includes a set of spacer elements 142 including: a first spacer element 144 arranged proximal a first lateral edge of the baseplate 136; and interposed between the baseplate 136 and a bottom layer of the substrate 112; and a second spacer element 146 arranged proximal a second lateral edge, opposite the first lateral edge, of the baseplate 136 and interposed between the baseplate 136 and the bottom layer of the substrate 112. Thus, in this implementation, the haptic actuator 110 includes: a third lateral edge, normal to the first lateral edge and the second lateral edge; and a fourth lateral edge, opposite the third lateral edge, each exposed and susceptible to environmental damage (e.g., dust damage, water damage). Accordingly, the system 100 can include a waterproofing membrane: extending across the third lateral edge and the fourth lateral edge of the haptic actuator 110; retained about a perimeter of the substrate 112; and cooperating with the baseplate 136 to seal the haptic actuator no. For example, the waterproofing membrane can include a silicone or PTFE (e.g., expanded PTFE) film bonded over the substrate 112 and the baseplate 136. The system 100 can also include a glass or other cover layer 162 bonded over the waterproofing membrane and extending up to a perimeter of the substrate 112. Therefore, the system 100 can prevent moisture and particulate ingress into the haptic actuator 110 and onto the substrate 112 and the first magnetic element 138.

5. Mobile Device Chassis Integration

Generally, the system 100 includes a chassis 150 including: a middle frame 152 supporting the touchscreen; and a rear frame 154 arranged below the middle frame 152 and defining a vertical gap between the middle frame 152 and the rear frame 154. The system 100 further includes the haptic actuator no: arranged intermediate the middle frame 152 and the rear frame 154; and bonded to the middle frame 152 and/or the rear frame 154 in order to transfer oscillating forces generated by the haptic actuator 110 to the middle frame 152—and therefore the touchscreen—and the rear frame 154 of the chassis 150.

5.1 Middle Frame Integration

In one implementation, the system 100 includes: the haptic actuator 110 including the substrate 112 coupled (e.g., adhesively bonded) to the middle frame 152 of the chassis 150; and a set of standoffs arranged proximal the haptic actuator 110 within the chassis 150. In this implementation, the set of standoffs: is coupled (e.g., adhesively bonded, rigidly mounted) to the middle frame 152 and the rear frame 154 of the chassis 150; vertically supports the rear frame 154 below the middle frame 152; and is configured to transfer oscillating forces generated by the haptic actuator 110—including the substrate 112 bonded to the middle frame 152—to the rear frame 154 of the chassis 150, thereby delivering these oscillating forces, such as to the user's palm operating a mobile device 148.

In one example, the system 100 includes a substrate 112 including a first layer 116: arranged (e.g., adhesively bonded to) the middle frame 152 of the chassis 150; and a second layer 120 arranged below the first layer 116. In particular the first layer 116 defines: a top side adhesively bonded to a bottom side of the middle frame 152 of the chassis 150; and a bottom side adhesively bonded to a top side of the second layer 120. In this example, the system 100 further includes: the set of spacer elements 142 vertically supporting a baseplate 136 below the substrate 112; and the first magnetic element 138 rigidly coupled to the baseplate 136 and facing the multi-layer inductor 124. In particular, the substrate 112, set of spacer elements 142, first magnetic element 138, and the baseplate 136 cooperate to define a particular height (e.g., 1.4 mm to 1.7 mm-thickness) extending within the vertical gap between the middle frame 152 and the rear frame 154. Additionally, the system 100 can include a set of standoffs: arranged proximal the haptic actuator 110 within the chassis 150; vertically supporting the rear frame 154 below the middle frame 152; and defining the vertical gap between the middle frame 152 and the rear frame 154. In this example, the set of standoffs can include a first standoff: arranged proximal a first side of the haptic actuator 110; and arranged intermediate the middle frame 152 and the rear frame 154. Additionally, the set of standoffs can include a second standoff: arranged proximal a second side, opposite the first side, of the haptic actuator 110; arranged intermediate the middle frame 152 and the rear frame 154; and cooperating with the first standoff to define the vertical gap within the chassis 150. Furthermore, the set of standoffs can be formed of a low-durometer or elastic material that deflects laterally within the chassis 150 responsive to alternating magnetic coupling between the multi-layer inductor 124 and the first magnetic element 138 during the haptic feedback cycle.

Therefore, the system 100 can, during a haptic feedback cycle, drive an oscillating voltage through the multi-layer inductor 124 in order to induce magnetic coupling between the multi-layer inductor 124 and the first magnetic element 138, thereby oscillating the substrate 112 bonded to the middle frame 152 of the chassis 150. As a result, the oscillating forces generated by the haptic actuator 110 are transferred: to the touchscreen supported on the middle frame 152 via the substrate 112 bonded to the middle frame 152 of the chassis 150; and to the rear frame 154 of the chassis 150 via the set of standoffs arranged proximal the haptic actuator 110 within the chassis 150.

In another implementation, the system 100 includes a haptic actuator no including a multi-layer inductor 124 integrated into an existing printed circuit board assembly (PCBA) arranged within the chassis 150 of a mobile device 148. In this implementation, the system 100 includes a PCBA: arranged (e.g., adhesively bonded to) a bottom side of the middle frame 152 of the chassis 150; and including substrate layers defining the multi-layer inductor 124 facing the first magnetic element 138 to form the haptic actuator 110 within the chassis 150. Additionally, the set of standoffs can be arranged: intermediate the PCBA and the rear frame 154 within the chassis 150; and proximal the multi-layer inductor 124 in the PCBA in order to define the vertical gap within the chassis 150. The system 100 can then drive an oscillating voltage through the multi-layer inductor 124 integrated in the PCBA in order to induce magnetic coupling between the PCBA and the first magnetic element 138, thereby oscillating the PCBA and therefore the touchscreen arranged over the middle frame 152 of the chassis 150.

In one example, the system 100 includes a PCBA including: a top layer arranged (e.g., adhesively bonded to) a bottom side of the middle frame 152 of the chassis 150; an intermediate layer arranged below the top layer and including a first spiral trace 118; and a bottom layer arranged below the intermediate layer and including a second spiral trace 122 cooperating with the first spiral trace 118 to form the multi-layer inductor 124 facing the first magnetic element 138. In this example, the system 100 includes a set of spacer elements 142: arranged below the bottom layer of the PCBA, proximal the multi-layer inductor 124 on the PCBA; and vertically supporting the first magnetic element 138 below the multi-layer inductor 124 within the chassis 150. Additionally, the system 100 includes a set of standoffs including a first standoff: arranged proximal a first side of the multi-layer inductor 124 on the PCBA; and arranged intermediate the PCBA and the rear frame 154 of the chassis 150. Furthermore, the set of standoffs includes a second standoff: arranged proximal a second side, opposite the first side, of the multi-layer inductor 124 on the PCBA; and arranged intermediate the PCBA and the rear frame 154 of the chassis 150 to define the vertical gap within the chassis 150.

Therefore, the system 100 can drive an oscillating voltage through the multi-layer inductor 124 integrated within the PCBA in order to induce magnetic coupling between the multi-layer inductor 124 and the first magnetic element 138 and oscillate the PCBA, thereby eliminating external electrical connections from the controller 166 directly to the haptic actuator 110 within the chassis 150 of the mobile device 148.

5.2 Rear Frame Integration

In one implementation, the system 100 includes the haptic actuator 110 including: the substrate 112 arranged (e.g., adhesively bonded to) a bottom side of the middle frame 152 of the chassis 150; a baseplate 136 (e.g., magnetic yoke) arranged (e.g., adhesively bonded to) a top side of the rear frame 154 of the chassis 150 below the multi-layer inductor 124; and the first magnetic element 138 rigidly coupled to the baseplate 136 and facing the multi-layer inductor 124 to form the haptic actuator 110 within the chassis 150. In this implementation, the first magnetic element 138: is located approximately centered to the multi-layer inductor 124 of the substrate 112; extends laterally across a primary axis of the multi-layer inductor 124; and is coupled to the baseplate 136 to define a nominal gap between the substrate 112 and the first magnetic element 138. In particular, in this implementation, the system 100 can eliminate flexible coupling between the substrate 112 and the first magnetic element 138 of the haptic actuator 110 and transfer oscillating forces—generated from the haptic actuator 110—directly to the middle frame 152 and the rear frame 154 of the chassis 150.

In one example, the system 100 can drive an oscillating voltage across the multi-layer inductor 124 in the substrate 112 in order to induce magnetic coupling between the multi-layer inductor 124 and the first magnetic element 138, which in turn: oscillates the substrate 112—bonded to the middle frame 152 of the chassis 150—and thus the touchscreen; and oscillates the baseplate 136 bonded to the rear frame 154 of the chassis 150. Therefore, the system 100 can deliver haptic feedback (e.g., oscillating forces) directly to the middle frame 152 and the rear frame 154 of the chassis 150 via the haptic actuator 110, thereby reducing or eliminating dampening of this haptic feedback resulting from rigid coupling of: the first magnetic element 138 to the substrate 112 via the set of spacer elements 142; and the rear frame 154 to the middle frame 152 of the chassis 150 via the set of standoffs.

In another implementation, the system 100 includes a haptic actuator no including: a multi-layer inductor 124 integrated into an existing printed circuit board assembly (PCBA) arranged within the chassis 150 of a mobile device 148; a baseplate 136 (e.g., magnetic yoke) arranged (e.g., adhesively bonded) to a top side of the rear frame 154 of the chassis 150 below the multi-layer inductor 124; and the first magnetic element 138 rigidly coupled to the baseplate 136 and facing the multi-layer inductor 124 to form the haptic actuator 110 within the chassis 150. In this implementation, the system 100 includes the PCBA: arranged (e.g., adhesively bonded) to a bottom side of the middle frame 152 of the chassis 150; and including substrate layers defining the multi-layer inductor 124 facing the first magnetic element 138 to form the haptic actuator 110 within the chassis 150. Additionally, the first magnetic element 138: is located approximately centered to the multi-layer inductor 124 of the PCBA; extends across a primary axis of the multi-layer inductor 124; and coupled to the baseplate 136 to define a nominal gap between the substrate 112 and the first magnetic element 138. Therefore, the system 100 can include a haptic actuator 110 including: a multi-layer inductor 124 integrated into an existing PCBA within the chassis 150 of a mobile device 148; and a first magnetic element 138 directly bonded to a rear frame 154 of the chassis 150 and facing the multi-layer inductor 124 of the PCBA. As a result, the system 100 can eliminate external electrical connections from the controller 166 to the haptic actuator 110 within the chassis 150 and eliminate dampening of oscillating forces—generated by the haptic actuator 110—resulting from rigid coupling of the substrate 112 to the first magnetic element 138.

5.3 Haptic Actuator Localization

Generally, the system 100 can include a set of haptic actuators arranged within the chassis 150 of a mobile device 148 in order to deliver localized haptic feedback response to regions of the touchscreen coupled to the chassis 150.

5.3.1 Touchscreen Haptic Feedback Localization

In one implementation, the system 100 can include: a first haptic actuator 110 arranged within the chassis 150 and below a first region of the touchscreen; and a second haptic actuator arranged within the chassis 150 and below a second region of the touchscreen. The system 100 can thus: detect a touch input on the touchscreen; interpret a particular region of the touch input on the touchscreen; and drive an oscillating voltage to a particular haptic actuator 110 arranged below the particular region of the touchscreen in order to deliver a localized haptic feedback response to this first region of the touchscreen during a haptic feedback cycle.

In another implementation, the system 100 can include: a first touchscreen arranged on the chassis 150; and a second touchscreen arranged adjacent to the first touchscreen on the chassis 150. Additionally, the system 100 can include: a first haptic actuator 110 arranged within the chassis 150 below the first touchscreen; and a second haptic actuator arranged within the chassis 150 below the second touchscreen. The system 100 can then selectively drive an oscillating voltage to these haptic actuators responsive to detecting inputs on the first touchscreen and/or the second touchscreen on the chassis 150, thereby delivering haptic feedback response to the first touchscreen and the second touchscreen during a haptic feedback cycle.

5.3.2 Button Haptic Feedback Localization

Generally, a "button" as referred to herein is an element of a user interface (e.g., virtual, mechanical) which a user can select to perform a particular action. In one implementation, the system 100 can include: a haptic actuator 110 arranged proximal a lateral edge within the chassis 150; and a button 164 coupled (e.g., mechanically coupled) to the haptic actuator 110 at the lateral edge of the chassis 150 (e.g., embedded within the lateral edge of the chassis 150, protruding from the chassis 150. The system 100 can thus, detect a touch input at the button 164 arranged at the lateral edge of the chassis 150; and drive an oscillating voltage to the haptic actuator 110—coupled to the button 164 at the lateral edge of the chassis 150—in order to transfer oscillating forces from the haptic actuator 110 to the button 164 and thus deliver a localized haptic feedback response to a user interfacing with the button 164 of the mobile device 148.

In one example, the button 164 includes a mechanical switch: arranged about a lateral edge of the mobile device 148 (e.g., flush with the lateral edge, proud from the lateral edge); and coupled to the haptic actuator no. In another example, the button 164 defines a virtual button: arranged at the lateral edge of the mobile device 148; and defining a touch sensor (e.g., resistive touch, capacitive touch) configured to detect lateral touch inputs applied by a user. Thus, the system 100 can: detect a touch input at a particular location about the lateral edge of the mobile device 148; and trigger a haptic feedback cycle at the haptic actuator 110 in order to deliver haptic feedback in response to detecting the touch input. In another example, the button 164 defines a touch region about the lateral edge of the mobile device 148 arranged adjacent the haptic actuator 110. In this example and as described below, the system 100 can: read a set of electrical values from the multi-layer inductor 124 at the haptic actuator no; detect a touch input at the touch region based on deviations of the set of electrical values from baseline electrical values; and trigger a haptic feedback cycle at the haptic actuator 110 in response to detecting the touch input.

In another implementation, the system 100 can include: a first set of haptic actuators arranged proximal a first lateral edge within the chassis 150; and a second set of haptic actuators arranged proximal a second lateral edge, opposite the first lateral edge, within the chassis 150. In this implementation, each haptic actuator no, in the first set of haptic actuators can include a button 164 coupled (e.g., mechanically) coupled to the haptic actuator 110 at the first lateral edge of the chassis 150. Similarly, each haptic actuator no, in the second set of haptic actuators include a button 164 coupled (e.g., mechanically) coupled to the haptic actuator 110 at the first lateral edge of the chassis 150. The system 100 can thus, detect a first touch input at a first button 164 arranged on the first lateral edge of the chassis 150; detect a second touch input at a second button 164 arranged on the second lateral edge of the chassis 150; and drive a first oscillating voltage to a first haptic actuator 110 coupled to the first button 164 at the first lateral edge of the chassis 150; and drive a second oscillating voltage to a second haptic actuator coupled to the second button 164 at the second lateral edge of the chassis 150.

In one example, the system 100 can include a haptic actuator 110: arranged within the vertical gap of the chassis 150; and arranged proximal a first lateral edge of the chassis 150. In this example, the haptic actuator 110 includes: a substrate 112 including a set of inductor layers 114 forming a multi-layer inductor 124; and a magnetic element defining the first polarity and facing the multi-layer inductor 124. Furthermore, the system 100 includes a button 164: arranged flush with the first lateral edge of the chassis 150; coupled to the haptic actuator 110; and defining a touch sensor surface at the mobile device 148. The controller 166 is configured to, in response to detecting a touch input at the touch sensor surface, drive an oscillating voltage across the multi-layer inductor 124 to: induce alternating magnetic coupling between the multi-layer inductor 124 and the magnetic element; and oscillate the touch sensor surface relative the magnetic element.

In yet another implementation as described in U.S. Non-Provisional application Ser. No. 17/722,994, filed on 18 Apr. 2022, which is hereby incorporated in its entirety by this reference, the system 100 can be integrated into a mobile device 148 (e.g., a smartphone, a tablet, a laptop computer) defining a continuous pressure sensor along one or more sides of the mobile device and thus enable the mobile device to detect both force magnitudes and locations of inputs along the side of the mobile device over a range of force magnitudes and over a (nearly-) continuous range of location. In particular, the system 100 can include: a sensor module arranged behind side of a mobile device; and a controller that detects locations and force magnitudes of inputs on the side of the mobile device based on sense signals output by the sensor module, dynamically links these side inputs to particular input types based on these input characteristics and/or virtual buttons rendered on a display of the mobile device adjacent the locations of these side inputs, and then triggers context-dependent (e.g., application-specific) command functions at the mobile device and execute haptic feedback cycles at the haptic actuators in the mobile device based on these input types. For example, the sensor module can be integrated into a side of a mobile device (e.g., in place of mechanical buttons) in order to transform the perimeter of the mobile device into a force-sensitive input surface. The controller (or other processor in the mobile device) can then dynamically reassign regions or segments of the side of the mobile device to different input types (e.g., volume control, camera shutter control) based on: a lock screen, home screen, or application open on the mobile device; an orientation of the mobile device; a last touch location on the side of the mobile device; and/or custom settings entered by the user.

6. Modifying Haptic Feedback Output

In one implementation, the system 100 can be modified to increase haptic feedback response from the haptic actuator 110 within the chassis 150 while maintaining a target height within the vertical gap within the chassis 150. In one example, a width and length of the substrate 112 and the first magnetic element 138 can be concurrently increased while maintaining the target height within the chassis 150, which in turn increases haptic feedback response from the haptic actuator 110. In another example, the system 100 can include a haptic actuator 110 including: a substrate 112 including a dual-core multi-layer inductor 124; and a set of magnetic elements arranged over the dual-core multi-layer inductor 124 to increase haptic feedback response from the haptic actuator 110.

In another implementation, the system 100 can increase haptic feedback response from the haptic actuator 110 within the chassis 150 by increasing a vertical height of the haptic actuator 110 within the vertical gap within the chassis 150. For example, the system 100 can be modified, such as by increasing thickness of the first magnetic element 138, and/or increasing copper thickness for the spiral traces of the multi-layer inductor 124, thereby increasing haptic feedback output by the haptic actuator 110.

7. Variation: Inductive Force Sensing

In one variation, the system 100 includes: a touchscreen; a chassis 150; a haptic actuator 110; and a controller 166. The touchscreen includes a set of drive and sense electrode pairs 158. The chassis 150 includes: a middle frame 152 arranged below the touchscreen; and a rear frame 154 arranged below the middle frame 152 and defining a vertical gap between the middle frame 152 and the rear frame 154. The haptic actuator 110 is arranged within the vertical gap and includes: a substrate 112; and a first magnetic element 138. The substrate 112 includes a first layer 116 and a second layer 120. The first layer 116: is arranged below the middle frame 152 of the chassis 150; and includes a first spiral trace 118 coiled in a first direction and defining a first terminal at a periphery of the substrate 112. The second layer 120: is arranged below the first layer 116; includes a second spiral trace 122 coiled in a second direction, opposite the first direction, coupled to the first spiral trace 118 and defining a second terminal at the periphery of the substrate 112; and cooperates with the first spiral trace 118 to form a multi-layer inductor 124. The first magnetic element 138: is arranged below the substrate 112; and defines a first polarity facing the multi-layer inductor 124.

In this variation, the controller 166 is configured to: read a first set of electrical values from the multi-layer inductor 124 during a first time period; interpret a touch input at the touchscreen based on a first change in electrical values in the first set of electrical values; and, in response to interpreting the touch input, drive an oscillating voltage across the multi-layer inductor 124 during a first haptic feedback cycle to induce alternating magnetic coupling between the multi-layer inductor 124 and the first magnetic element 138 in order to oscillate the touchscreen.

8. Example: Seamless Mobile Device

In one implementation, the system 100 includes: a haptic actuator 110 integrated into a human-computer interface system 100 (e.g., a laptop device); a cover layer 162 defining a seamless trackpad surface and/or a seamless keyboard surface across the chassis 150; and a controller 166 configured to trigger the haptic actuator 110 to oscillate the seamless trackpad surface and/or seamless keyboard surface responsive to touch inputs applied to the touch sensor surface.

In one example, the system 100 can include: a substrate 112; a rigid (e.g., aluminosilicate glass) layer; an array of spring elements; a coupling plate; a haptic feedback actuator; and a controller 166. The substrate 112 includes: a top layer; a bottom layer; an array of force sensors arranged on the bottom layer; and an array of support locations arranged on the bottom layer adjacent the array of force sensors. The rigid layer (hereinafter the "glass layer"): includes a top layer defining a touch sensor surface and a bottom layer extending across the top layer of the substrate 112; and is bonded (e.g., with a pressure sensitive adhesive) to the top layer of the substrate 112.

The array of spring elements is configured to couple the substrate 112 to the chassis 150 and to yield to displacement of the substrate 112 downward toward the chassis 150 responsive to forces applied to the touch sensor surface, each spring element in the array of spring elements coupled to the substrate 112 at a support location in the array of support locations. The coupling plate is configured to couple to the chassis 150 adjacent the array of spring elements and effect capacitance values of the array of force sensors responsive to displacement of the substrate 112 toward the coupling plate.

The haptic actuator 110: is arranged below the substrate 112; and is configured to oscillate the touch sensor surface in a vertical direction (i.e., the z-direction) in response to interpreting a force magnitude exceeding a target force magnitude for an input applied to the touch sensor surface. The controller 166 is configured to read capacitance values from the array of force sensors and interpret force magnitudes of inputs applied to the touch sensor surface based on capacitance values read from the array of force sensors.

In another example, the chassis 150 defines a cavity 178 proximal a trackpad region of the chassis 150. In this example, the cover layer 162: defines a continuous surface across the trackpad region of the chassis 150; and defines a first touch region 180 within the trackpad region of the cover layer 162. Additionally, the system 100 includes a touch sensor layer: arranged below the first touch region 180 of the cover layer 162; and comprising a first set of drive and sense electrode pairs 158 patterned across the touch sensor layer and defining a touch sensor. The haptic actuator 110: is arranged within the cavity 178 of the chassis 150; and includes the substrate 112 including a top layer bonded to the touch sensor layer. Thus, the controller 166 is configured to: read a first set of electrical values from the first set of drive and sense electrode pairs 158; and detect the first touch input on the touch sensor surface based on the first set of electrical values.

In yet another example, the system 100 can include a mobile device 148 including: a touch display encompassing a front face and lateral sides of the device; and a set of haptic actuators 110 arranged within a chassis supporting the touch display. Thus, the mobile device 148 can define a seamless touch sensor surface encompassing the front face and the lateral sides of the mobile device 148. Additionally, or alternatively, the touch display can also encompass the rear face of the mobile device 148. Therefore, the system 100 can: detect touch inputs applied at locations on the seamless touch sensor surface; and execute haptic feedback cycles at a haptic actuator 110 (or set of haptic actuators) arranged within the mobile device 148 in response to detecting inputs on the seamless touch sensor surface.

9. Example: Vehicle Integration

In one implementation, the system 100 includes a haptic actuator no: arranged within a vehicle, such as at a display screen in the vehicle, at the steering wheel 168, and/or at the arm rest of the vehicle; and configured to—responsive to control inputs received by an operator within the vehicle— deliver haptic feedback to the operator and/or passenger within the vehicle.

In one example, the system 100 includes a steering wheel 168 including: a rim 170 rotatable about a first axis to steer a vehicle; and a hub 172 coupled to the rim 170 and defining a first input region 174 and a cavity 178 proximal the first input region 174. In this example, the haptic actuator 110 is arranged within the cavity 178 of the hub 172. Furthermore, the cover layer 162: extends across the first input region 174 of the hub 172; and defines a first key location 176 over the first haptic actuator no. Thus, the controller 166 is configured to, in response to detecting the first touch input at the touch sensor surface, register a first keystroke of a first key type associated with the first key location 176 defined over the first haptic actuator no. In one variation of this example, the first key location 176 can correspond to a volume control (e.g., volume up, volume down) for an infotainment system 100 of the vehicle. Therefore, in response to detecting a first touch input at the first key location 176, the controller 166 can: modify volume of media broadcast within the vehicle; and trigger a haptic feedback cycle at the haptic actuator 110 to deliver haptic feedback at the first key location 176 on the hub 172 of the steering wheel 168.

Therefore, the system 100 can include the haptic actuator 110 arranged within the vehicle (e.g., steering wheel 168, vehicle seat, display screen, arm rest) in order to deliver haptic feedback responsive to user inputs detected by the controller 166 within the vehicle.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device 148, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for delivering haptic feedback comprising:
   a first haptic actuator comprising:
      a substrate comprising:
         a set of inductor layers defining a first multi-layer inductor; and
         a first set of terminals arranged about a periphery of the substrate and coupled to the first multi-layer inductor;
      a baseplate arranged opposite the substrate;
      a first magnetic element:
         arranged on the baseplate; and
         defining a first polarity facing the first multi-layer inductor; and
      a first set of spacer elements:
         interposed between the baseplate and the substrate;
         arranged proximal perimeter edges of the baseplate; and
         defining a nominal gap between the first magnetic element and the first multi-layer inductor;
   a cover layer arranged over the first haptic actuator and defining a touch sensor surface; and
   a controller coupled to the first set of terminals and configured to, in response to detecting a first input on the touch sensor surface, drive an oscillating voltage across the first multi-layer inductor to:
      induce alternating magnetic coupling between the first multi-layer inductor and the first magnetic element; and
      oscillate the substrate and the cover layer relative to the first magnetic element.

2. The system of claim 1, wherein the set of inductor layers comprises:
   a first layer comprising a first spiral trace:
      coiled in a first direction; and
      defining a first end and a second end, the first end defining a first terminal in the first set of terminals; and
   a second layer:
      arranged below the first layer; and
      comprising a second spiral trace:
         coiled in a second direction opposite the first direction;

defining a third end and a fourth end, the third end electrically coupled to the second end of the first spiral trace, and the fourth end defining a second terminal in the first set of terminals; and cooperating with the first spiral trace to form the first multi-layer inductor.

3. The system of claim 2:

wherein the first spiral trace defines a first planar coil spiraling inwardly in a clockwise direction within the first layer; and wherein the second spiral trace defines a second planar coil spiraling outwardly in a counter-clockwise direction within the second layer and cooperating with the first spiral trace to pass current in a common direction about a center of the first multi-layer inductor.

4. The system of claim 2:

wherein the first layer further comprises a third spiral trace:
arranged adjacent the first spiral trace;
coiled in the second direction; and
defining a fifth end and a sixth end, the fifth end defining the second terminal in the first set of terminals; and wherein the second layer further comprises a fourth spiral trace:
arranged adjacent the second spiral trace;
coiled in the first direction;
defining a seventh end and an eighth end, the seventh end electrically coupled to the sixth end of the third spiral trace, and the eighth end connected to the fourth end of the second spiral trace; and
cooperating with the third spiral trace to form a second multi-layer inductor.

5. The system of claim 4:

further comprising a second magnetic element:
arranged on the baseplate adjacent the first magnetic element; and
defining the first polarity facing the second multi-layer inductor; and wherein the controller is configured to, in response to detecting the first touch input on the touch sensor surface, drive the oscillating voltage across the fourth end of the second spiral trace and the eighth end of the fourth spiral trace to:
induce alternating magnetic coupling between the first multi-layer inductor and the first magnetic element and between the second multi-layer inductor and the second magnetic element; and
oscillate the substrate and the cover layer relative to the first magnetic element and the second magnetic element.

6. The system of claim 1:

further comprising a second magnetic element:
arranged on the baseplate adjacent the first magnetic element; and
defining a second polarity, opposite the first polarity, facing the first multi-layer inductor; and wherein the controller is configured to, in response to detecting the first touch input on the touch sensor surface, drive the oscillating voltage across the first multi-layer inductor to:
induce alternating magnetic coupling between the first multi-layer inductor, the first magnetic element, and the second magnetic element; and
oscillate the substrate and the cover layer parallel to the touch sensor surface.

7. The system of claim 1, wherein the controller is configured to:
read a first set of electrical values from the multi-layer inductor; and
in response to detecting a first change in electrical value at the first multi-layer inductor based on the first set of electrical values:
detect the first touch input at the touch sensor surface; and
trigger the oscillating voltage across the first multi-layer inductor during a first haptic feedback cycle to:
induce alternating magnetic coupling between the first multi-layer inductor and the first magnetic element; and
oscillate the substrate and the cover layer relative the first magnetic element.

8. The system of claim 1:

further comprising a chassis of a mobile device comprising:
a middle frame arranged below the cover layer; and
a rear frame arranged opposite the middle frame and defining a vertical gap between the middle frame and the rear frame;

wherein the first haptic actuator is:
arranged within the vertical gap between the middle frame and the rear frame; and
bonded to the middle frame of the chassis;

further comprising a touchscreen display:
arranged over the middle frame of the chassis; and
comprising a set of drive and sense electrode pairs arranged across a top surface of the touchscreen display;

wherein the cover layer is arranged over the set of drive and sense electrode pairs across the touchscreen display; and wherein the controller is configured to:
read a first set of electrical values from the set of drive and sense electrode pairs; and
detect the first touch input on the cover layer based the first set of electrical values.

9. The system of claim 8:

wherein the touchscreen display defines a first touch region and a second touch region adjacent the first touch region;

wherein the first haptic actuator is arranged within the chassis and below the first touch region of the touchscreen display;

further comprising a second haptic actuator:
arranged within the vertical gap of the chassis and below the second touch region of the touchscreen display; and
comprising:
a second substrate comprising a second set of inductor layers forming a second multi-layer inductor; and
a second magnetic element defining the first polarity and facing the second multi-layer inductor; and wherein the controller is configured to:
read a second set of electrical values from the set of drive and sense electrode pairs;
detect a second touch input on the second touch region of the touchscreen display based on the second set of electrical values; and
in response to detecting the second touch input, drive an oscillating voltage across the second multi-layer inductor to:

induce alternating magnetic coupling between the second multi-layer inductor and the second magnetic element; and oscillate the second touch region relative to the second magnetic element.

10. The system of claim 9:

further comprising a second haptic actuator:
arranged within the vertical gap of the chassis;
arranged proximal a first lateral edge of the chassis; and comprising:
a second substrate comprising a second set of inductor layers forming a second multi-layer inductor; and
a second magnetic element defining the first polarity and facing the second multi-layer inductor;

further comprising a button:
arranged flush with the first lateral edge of the chassis;
coupled to the second haptic actuator; and
defining a second touch sensor surface at the mobile device; and wherein the controller is configured to, in response to detecting a second touch input at the second touch sensor surface, drive an oscillating voltage across the second multi-layer inductor to:
induce alternating magnetic coupling between the second multi-layer inductor and the second magnetic element; and
oscillate the second touch sensor surface relative the second magnetic element.

11. The system of claim 1:

further comprising a steering wheel comprising:
a rim rotatable about a first axis to steer a vehicle; and
a hub coupled to the rim and defining a first input region and a cavity proximal the first input region;

wherein the first haptic actuator is arranged within the cavity of the hub;

wherein the cover layer:
extends across the first input region of the hub; and
defines a first key location over the first haptic actuator; and wherein the controller is configured to, in response to detecting the first touch input at the touch sensor surface, register a first keystroke of a first key type associated with the first key location defined over the first haptic actuator.

12. The system of claim 1:

further comprising a chassis of a computing device defining a cavity proximal a trackpad region of the chassis;

wherein the cover layer:
defines a continuous surface across the trackpad region of the chassis; and
defines a first touch region within the trackpad region of the cover layer;

further comprising a touch sensor layer:
arranged below the first touch region of the cover layer; and
comprising a first set of drive and sense electrode pairs patterned across the touch sensor layer and defining a touch sensor;

wherein the first haptic actuator:
is arranged within the cavity of the chassis; and
comprises the substrate comprising a top layer bonded to the touch sensor layer; and wherein the controller is configured to:
read a first set of electrical values from the first set of drive and sense electrode pairs; and detect the first touch input on the touch sensor surface based on the first set of electrical values.

13. A system for a haptic actuator comprising:

a substrate comprising:
a first layer comprising a first spiral trace coiled in a first direction;
a second layer:
arranged below the first layer; and
comprising a second spiral trace:
coiled in a second direction opposite the first direction;
coupled to the first spiral trace; and
cooperating with the first spiral trace to form a multi-layer inductor; and
a first set of terminals arranged about a periphery of the substrate and coupled to the first multi-layer inductor;

a baseplate arranged opposite the substrate;

a first magnetic element:
arranged on the baseplate;
defining a first polarity facing the first multi-layer inductor; and
configured to magnetically couple the multi-layer inductor to oscillate the substrate relative to the first magnetic element; and a first set of spacer elements:
interposed between the baseplate and the substrate;
arranged proximal perimeter edges of the baseplate; and
defining a nominal gap between the first magnetic element and the first multi-layer inductor.

14. The system of claim 13:

further comprising a chassis of a mobile device comprising:
a display;
a cover layer arranged over the display and defining a touch sensor surface;
a middle frame arranged below the display; and
a rear frame arranged below the middle frame and defining a vertical gap between the middle frame and the rear frame;

wherein the substrate is arranged within the vertical gap of the chassis and comprises a top layer coupled to the middle frame; and further comprising a controller configured to, in response to detecting a first touch input on the touch sensor surface, drive an oscillating voltage across the multi-layer inductor to:
induce alternating magnetic coupling between the multi-layer inductor and the first magnetic element; and
oscillate the cover layer relative to the first magnetic element.

15. The system of claim 13, further comprising:

a cover layer arranged over the substrate and defining a touch sensor surface;

a second magnetic element:
arranged on the baseplate adjacent the first magnetic element; and
defining a second polarity, opposite the first polarity, facing the first multi-layer inductor; and a controller configured to, in response to detecting a first touch input on the touch sensor surface, drive the oscillating voltage across the first multi-layer inductor to:

induce alternating magnetic coupling between the first multi-layer inductor, the first magnetic element, and the second magnetic element; and oscillate the substrate and the cover layer parallel to the touch sensor surface.

16. The system of claim 13, wherein the set of spacer elements comprises:
a first spacer element:
arranged proximal a first lateral edge of the baseplate; and
interposed between the baseplate and a bottom layer of the substrate; and
a second spacer element:
arranged proximal a second lateral edge, opposite the first lateral edge, of the baseplate; and
interposed between the baseplate and the bottom layer of the substrate.

17. A system comprising:
a substrate comprising:
a first layer comprising a first spiral trace coiled in a first direction;
a second layer:
arranged below the first layer; and
comprising a second spiral trace:
coiled in a second direction opposite the first direction;
coupled to the first spiral trace; and
cooperating with the first spiral trace to form a multi-layer inductor; and
a first set of terminals arranged about a periphery of the substrate and coupled to the first multi-layer inductor;
a baseplate arranged opposite the substrate; and
a set of magnetic elements:
arranged on the baseplate;
comprising:
a first magnetic element defining a first polarity facing the multi-layer inductor; and
a second magnetic element:
arranged adjacent the first magnetic element; and
defining a second polarity, opposite the first polarity, facing the multi-layer inductor; and
configured to magnetically couple the multi-layer inductor to oscillate the substrate parallel to the set of magnetic elements.

18. The system of claim 17:
further comprising a chassis of a mobile device comprising:
a display;
a cover layer arranged over the display and defining a touch sensor surface;
a middle frame arranged below the display; and
a rear frame arranged below the middle frame and defining a vertical gap between the middle frame and the rear frame;
wherein the substrate is arranged within the vertical gap of the chassis and comprises a top layer bonded to a bottom surface of the middle frame;
wherein the baseplate is arranged within the vertical gap of the chassis and comprises a bottom surface bonded to a top surface of the rear frame to locate the first magnetic element facing the first multi-layer inductor; and
further comprising a controller configured to, in response to detecting a first input on the touch sensor surface, drive an oscillating voltage across the first multi-layer inductor to:
induce alternating magnetic coupling between the first multi-layer inductor and the first magnetic element; and
oscillate the substrate and the cover layer relative to the first magnetic element.

19. The system of claim 17, further comprising a set of spacer elements comprising:
a first spacer element:
arranged proximal a first lateral edge of the baseplate; and
interposed between the baseplate and a bottom layer of the substrate; and
a second spacer element:
arranged proximal a second lateral edge, opposite the first lateral edge, of the baseplate; and
interposed between the baseplate and the bottom layer of the substrate.

20. The system of claim 17:
wherein the first spiral trace includes a first end and a second end, the first end defining a first terminal in the first set of terminals;
wherein the second spiral trace defines a third end and a fourth end, the third end electrically coupled to the second end of the first spiral trace; and
wherein the substrate further comprises:
a third layer:
arranged below the second layer opposite the first layer; and
comprising a third spiral trace:
coiled in the first direction; and
defining a fifth end and a sixth end, the fifth end electrically coupled to the fourth end of the second spiral trace; and
a bottom layer:
arranged below the third layer opposite the second layer; and
comprising a fourth spiral trace:
coiled in the second direction;
defining a seventh end and an eighth end, the seventh end electrically coupled to the sixth end of the third spiral trace, and the eighth end defining a second terminal in the first set of terminals; and
cooperating with the first spiral trace, the second spiral trace, and the third spiral trace to form the multi-layer inductor.

\* \* \* \* \*